United States Patent
Han et al.

(10) Patent No.: US 7,848,448 B2
(45) Date of Patent: Dec. 7, 2010

(54) METHOD OF GENERATING REFERENCE SIGNAL IN WIRELESS COMMUNICATION SYSTEM

(75) Inventors: Seung Hee Han, Anyang-si (KR); Minseok Noh, Anyang-si (KR); Daewon Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 306 days.

(21) Appl. No.: 12/205,530

(22) Filed: Sep. 5, 2008

(65) Prior Publication Data
US 2009/0080569 A1     Mar. 26, 2009

Related U.S. Application Data

(60) Provisional application No. 60/970,754, filed on Sep. 7, 2007, provisional application No. 60/972,401, filed on Sep. 14, 2007, provisional application No. 60/978,415, filed on Oct. 9, 2007, provisional application No. 60/978,687, filed on Oct. 9, 2007.

(30) Foreign Application Priority Data

Apr. 11, 2008   (KR) ...................... 10-2008-0033799

(51) Int. Cl.
*H04L 27/28*     (2006.01)
*H04L 1/00*      (2006.01)
*H04K 1/10*      (2006.01)
*H04J 11/00*     (2006.01)
*H04J 1/00*      (2006.01)

(52) U.S. Cl. ........................ 375/295; 375/260; 370/203; 370/480

(58) Field of Classification Search ................. 375/260, 375/295; 370/203, 480
See application file for complete search history.

(56) References Cited

U.S. PATENT DOCUMENTS

| | | | | |
|---|---|---|---|---|
| 2005/0243940 | A1* | 11/2005 | Huh et al. | 375/260 |
| 2006/0050799 | A1* | 3/2006 | Hou et al. | 375/260 |
| 2007/0165588 | A1* | 7/2007 | McCoy | 370/344 |
| 2007/0183386 | A1 | 8/2007 | Muharemovic et al. | |
| 2007/0189404 | A1* | 8/2007 | Baum et al. | 375/260 |

FOREIGN PATENT DOCUMENTS

| | | |
|---|---|---|
| KR | 10-0651509 B1 | 11/2000 |
| KR | 10-2004-0032021 A | 4/2004 |
| KR | 10-0560386 B1 | 3/2006 |
| KR | 10-2007-0023489 A | 2/2007 |
| KR | 10-2007-0050358 A | 5/2007 |
| KR | 10-2007-0055845 A | 5/2007 |

* cited by examiner

*Primary Examiner*—Betsy L Deppe
(74) *Attorney, Agent, or Firm*—Birch, Stewart, Kolasch & Birch, LLP

(57) ABSTRACT

A method of generating a reference signal includes acquiring a base sequence and acquiring a reference signal sequence with a length N from the base sequence. Good PAPR/CM characteristics of the reference signal can be kept to enhance performance of data demodulation or uplink scheduling.

14 Claims, 8 Drawing Sheets

METHOD OF GENERATING REFERENCE SIGNAL IN WIRELESS COMMUNICATION SYSTEM

CROSS-REFERENCE TO RELATED APPLICATIONS

This application claims the benefit of priority of U.S. Provisional application Ser. No. 60/970,754 filed on Sep. 7, 2007, U.S. Provisional application Ser. No. 60/972,401 filed on Sep. 14, 2007, U.S. Provisional application Ser. No. 60/978,415 filed on Oct. 9, 2007, U.S. Provisional application Ser. No. 60/978,687 filed on Oct. 9, 2007, and Korean Patent Application No. 102008-0033799 filed on Apr. 11, 2008, which are incorporated by reference in its entirety herein.

BACKGROUND

1. Technical Field

The present invention relates to wireless communication and, more particularly, to a method of generating a reference signal in a wireless communication system.

2. Related Art

In general, a sequence is used for various channels and signals in a wireless communication system. The sequence in the wireless communication system needs to satisfy the following characteristics:

(1) Good correlation characteristics to provide high detection performance, (2) Low CM (Cubic Metric) to enhance efficiency of a power amplifier, (3) Generation of a large number of sequences to transmit a large amount of information or to facilitate cell planning, (4) Being able to be generated in a closed form in order to reduce a capacity of a memory for the sequence.

A downlink synchronization channel is used to perform time and frequency synchronization between a base station and a user equipment and to perform cell searching. A downlink synchronization signal, namely, a sequence, is transmitted on the downlink synchronization channel, and synchronization is performed through a correlation operation with the received downlink synchronization signal. A physical cell ID can be identified through the downlink synchronization channel. Because a unique cell ID should be identified, as the number of available sequences is increased, it is advantageous in terms of cell planning.

An uplink synchronization channel is used to perform time and frequency synchronization and to perform access for a network registration, a scheduling request, or the like. A sequence is transmitted on the uplink synchronization channel, and each corresponding sequence is recognized as a single opportunity. Upon detecting a sequence, the base station can recognize through which opportunity the user equipment has transmitted the uplink synchronization channel. In addition, through the detected sequence, a timing tracking, a residual frequency offset, or the like, may be estimated. As the number of opportunities is increases, probability of collision between user equipments can be reduced. Thus, a larger number of sequences is advantageous in terms of cell planning. The uplink synchronization channel is called a random access channel (RACH) or a ranging channel depending on a system.

A sequence can be used as control information transmitted on a control channel. This means the control information such as an ACK (Acknowledgement)/NACK (Negative-Acknowledgement) signal, a CQI (Channel Quality Indicator), etc. can be mapped to the sequence. The larger number of available sequences is advantageous to transmit various control information.

A scrambling code is used to provide randomization or peak-to-average power ratio (PAPR) reduction. In terms of cell planning, a larger number of sequences are advantageous to be used for scrambling codes.

When several users are multiplexed in a single channel through code division multiplexing (CDM), a sequence may be used to guarantee orthogonality among users. A multiplexing capacity is related to the number of available sequences.

A reference signal is used by a receiver to estimate a fading channel and/or is used to demodulate data. Further, the reference signal is used to obtain synchronization when the user equipment awakes from a time/frequency tracking or in sleep mode. In this manner, the reference signal is utilized variably. The reference signal uses a sequence, and the larger number of sequences is advantageous in terms of cell planning. The reference signal is also called as pilot.

There are two types of uplink reference signals: a demodulation reference signal and a sounding reference signal. The demodulation reference signal is used for channel estimation for data demodulation, and the sounding reference signal is used for user scheduling. In particular, the uplink reference signal is transmitted by a user equipment with a limited battery capacity, so PAPR or CM characteristics of the sequences used for the uplink reference signal are critical. In addition, in order to lower the cost of the user equipment, it is necessary to reduce a mount of the memory required for generating sequences.

SUMMARY

A method is sought for generating a sequence suitable for an uplink reference signal.

A method is sought for transmitting an uplink reference signal.

In an aspect, a method of generating a reference signal in a wireless communication system is provided. The method includes acquiring a base sequence $x_u(n)$ and acquiring a reference signal sequence $r(n)$ with a length N from the base sequence $x_u(n)$, wherein the base sequence $x_u(n)$ is expressed by $x_u(n)=e^{jp(n)\pi/4}$, and if N=12, at least one of the values provided in the below table is used as a value of the phase parameter $p(n)$:

| p(0), . . . , p(11) | | | | | | | | | | | |
|---|---|---|---|---|---|---|---|---|---|---|---|
| -1 | 3 | -1 | 1 | 1 | -3 | -3 | -1 | -3 | -3 | 3 | -1 |
| -1 | 3 | 1 | 3 | 1 | -1 | -1 | 3 | -3 | -1 | -3 | -1 |
| -1 | -3 | 1 | 1 | 1 | 1 | 3 | 1 | -1 | 1 | -3 | -1 |
| -1 | 3 | -3 | 3 | -1 | 3 | 3 | -3 | 3 | 3 | -1 | -1 |

Further, it N=24, at least one of the values provided in the below table can be used as a value of the phase parameter $p(n)$:

| p(0), . . . , p(23) | | | | | | | | | | | | | | | | | | | | | | | |
|---|---|---|---|---|---|---|---|---|---|---|---|---|---|---|---|---|---|---|---|---|---|---|---|
| -1 | -3 | 3 | -1 | -1 | -1 | -1 | 1 | 1 | -3 | 3 | 1 | 3 | 3 | 1 | -1 | 1 | -3 | 1 | -3 | 1 | 1 | -3 | -1 |
| -1 | -3 | 3 | -3 | -3 | -3 | -1 | -1 | -3 | -1 | -3 | 3 | 1 | 3 | -3 | -1 | 3 | -1 | 1 | -1 | 3 | -3 | 1 | -1 |
| -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |

-continued

| p(0), ..., p(23) | | | | | | | | | | | | | | | | | | | | | | | |
|---|---|---|---|---|---|---|---|---|---|---|---|---|---|---|---|---|---|---|---|---|---|---|---|
| −1 | −3 | 1 | 1 | 3 | −3 | 1 | 1 | −3 | −1 | −1 | 1 | 3 | 1 | 3 | 1 | −1 | 3 | 1 | 1 | −3 | −1 | −3 | −1 |
| −1 | −3 | −1 | −1 | 1 | −3 | −1 | −1 | 1 | −1 | −3 | 1 | 1 | −3 | 1 | −3 | −3 | 3 | 1 | 1 | −1 | 3 | −1 | −1 |

The reference signal sequence r(n) can be acquired as r(n)=$e^{j\alpha n}$x$_u$(n), by a cyclic shift α of the base sequence x$_u$(n).

In another aspect, a method for transmitting a reference signal in a wireless communication system is provided. The method includes acquiring a reference signal sequence r(n) with a length N from a base sequence x$_u$(n), mapping the reference signal sequence to the N number of subcarriers, and transmitting the mapped reference signal sequences on an uplink channel, wherein the base sequence x$_u$(n) is expressed by x$_u$(n)=$e^{jp(n)\pi/4}$, and if N=12, at least one of the values provided in the below table is used as a value of the phase parameter p(n):

| p(0), ..., p(11) | | | | | | | | | | | |
|---|---|---|---|---|---|---|---|---|---|---|---|
| −1 | 3 | −1 | 1 | 1 | −3 | −3 | −1 | −3 | −3 | 3 | −1 |
| −1 | 3 | 1 | 3 | 1 | −1 | −1 | 3 | −3 | −1 | −3 | −1 |
| −1 | −3 | 1 | 1 | 1 | 1 | 3 | 1 | −1 | 1 | −3 | −1 |
| −1 | 3 | −3 | 3 | −1 | 3 | 3 | −3 | 3 | 3 | −1 | −1 |

DESCRIPTION OF EXEMPLARY
EMBODIMENTS

Hereinafter, downlink refers to communication from a base station (BS) to a user equipment (UE), and uplink refers to communication from the UE to the BS. In the downlink, a transmitter may be a part of the BS and a receiver may be a part of the UE. In the uplink, a transmitter may be a part of the UE, and a receiver may be a part of the BS. The UE may be a fixed or mobile, and may be referred to as another terminology, such as a mobile station (MS), a user terminal (UT), a subscriber station (SS), a wireless device, etc. The BS is generally a fixed station that communicates with the UE and may be referred to as another terminology, such as a nodeB, a base transceiver system (BTS), an access point, etc. There may be one or more cells within the coverage of the BS.

I. System

Figure 1:
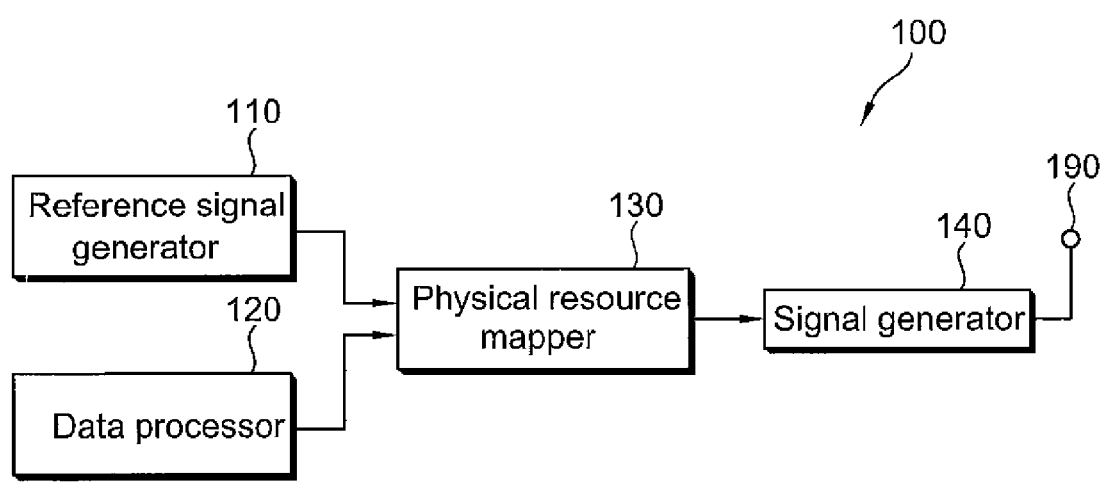
FIG. 1 is a schematic block diagram of a transmitter according to an embodiment of the present invention.

FIG. 1 is a schematic block diagram showing a transmitter according to an embodiment of the present invention.

Referring to FIG. 1, a transmitter 100 includes a reference signal generator 110, a data processor 120, a physical resource mapper 130 and a signal generator 140.

The reference signal generator 110 generates a sequence for a reference signal. There are two types of reference signals: a demodulation reference signal and a sounding reference signal. The demodulation reference signal is used for channel estimation for data demodulation, and the sounding reference signal is used for uplink scheduling. The same reference signal sequence may be used for the demodulation reference signal and the sounding reference signal.

The data processor 120 processes user data to generate complex-valued symbols. The physical resource mapper 130 maps the complex-valued symbols for the reference signal sequence and/or user data to physical resources. The complex-valued symbols may be mapped to mutually exclusive physical resources. The physical resources may be called as resource elements or subcarriers.

The signal generator 140 generates a time domain signal to be transmitted via a transmit antenna 190. The signal generator 140 may generate the time domain signal according to an single carrier-frequency division multiple access (SC-FDMA) scheme and, in this case, the time domain signal outputted from the signal generator 140 is called an SC-FDMA symbol or an orthogonal frequency division multiple access (OFDMA) symbol.

In the following description, it is assumed that the signal generator 140 uses the SC-FDMA scheme, but it is merely taken as an example and there is no limit of the multi-access scheme to which the present invention is applied. For example, the present invention can be applied for various other multi-access schemes such as an OFDMA, code division multiple access (CDMA), time division multiple access (TDMA) or frequency division multiple access (FDMA).

Figure 2:
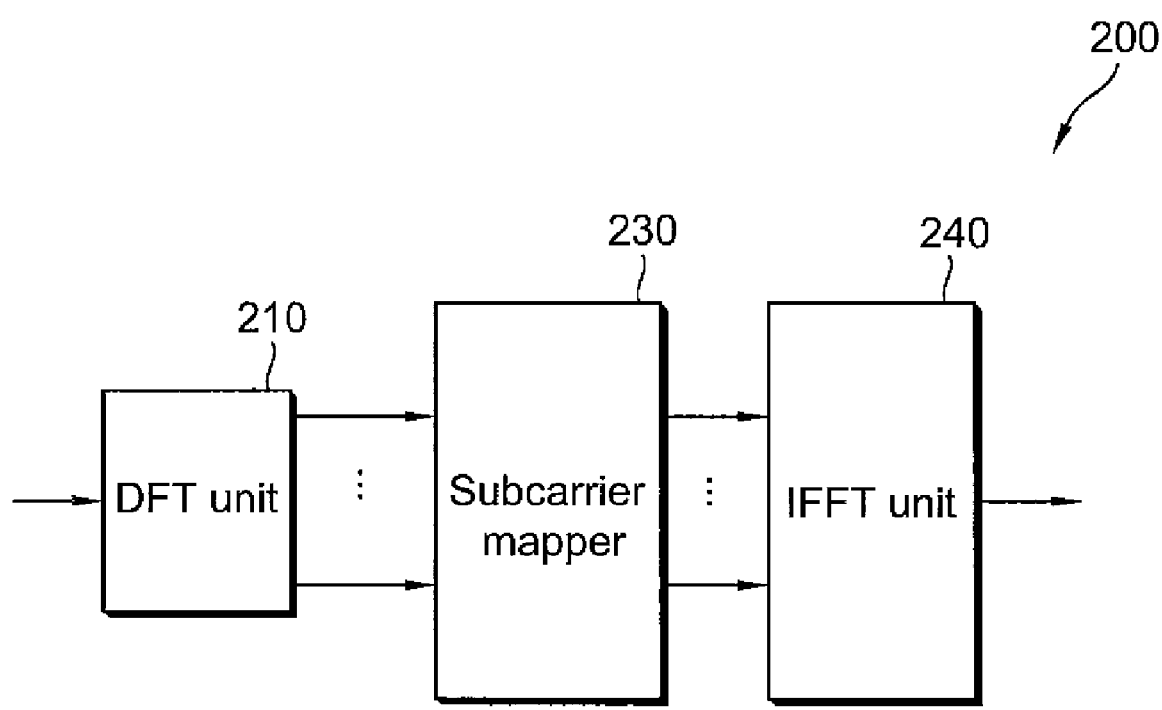
FIG. 2 is a schematic block diagram of a signal generator according to SC-FDMA scheme.

FIG. 2 is a schematic block diagram of a signal generator according to the SC-FDMA scheme.

With reference to FIG. 2, the signal generator 200 includes a discrete Fourier transform (DFT) unit 210 to perform DFT, a subcarrier mapper 230, and an inverse fast Fourier transform (IFFT) unit 240 to perform IFFT. The DFT unit 210 performs DFT on inputted data and outputs frequency domain symbols. The subcarrier mapper 230 maps the frequency domain symbols to each subcarrier, and the IFFT unit 240 performs IFFT on inputted symbols to output a time domain signal.

A reference signal may be generated in the time domain and inputted to the DFT unit 210. Alternatively, the reference signal may be generated in the frequency domain and directly mapped to subcarriers.

Figure 3:
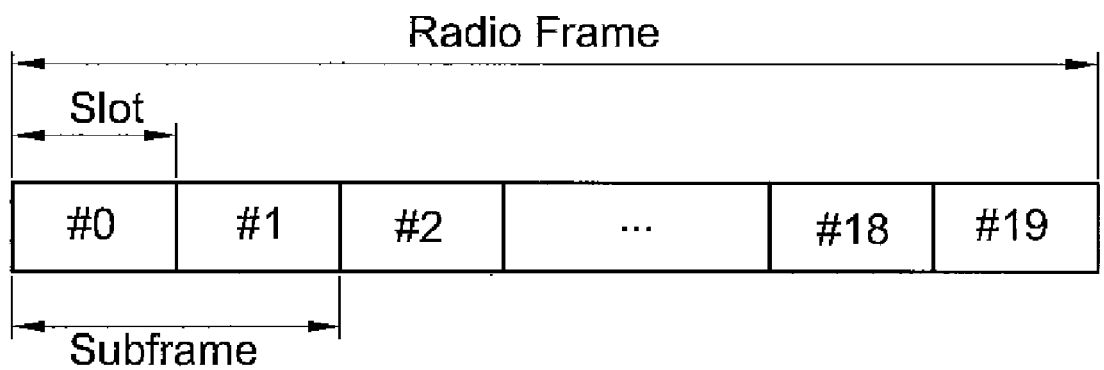
FIG. 3 shows the structure of a radio frame.

FIG. 3 shows the structure of a radio frame.

With reference to FIG. 3, a radio frame includes ten subframes. Each subframe includes two slots. An interval for transmitting a single subframe is called a transmission time interval (TTI). For example, the TTI may be 1 milli-second (ms) and the interval of a single slot may be 0.5 ms. A slot may include a plurality of SC-FDMA symbols in the time domain and a plurality of resource blocks in the frequency domain.

The structure of the radio frame is merely an example, and the number of subframes included in the radio frame, the number of slots included in the subframe, and the number of SC-FDMA symbols included in the slot may vary.

Figure 4:
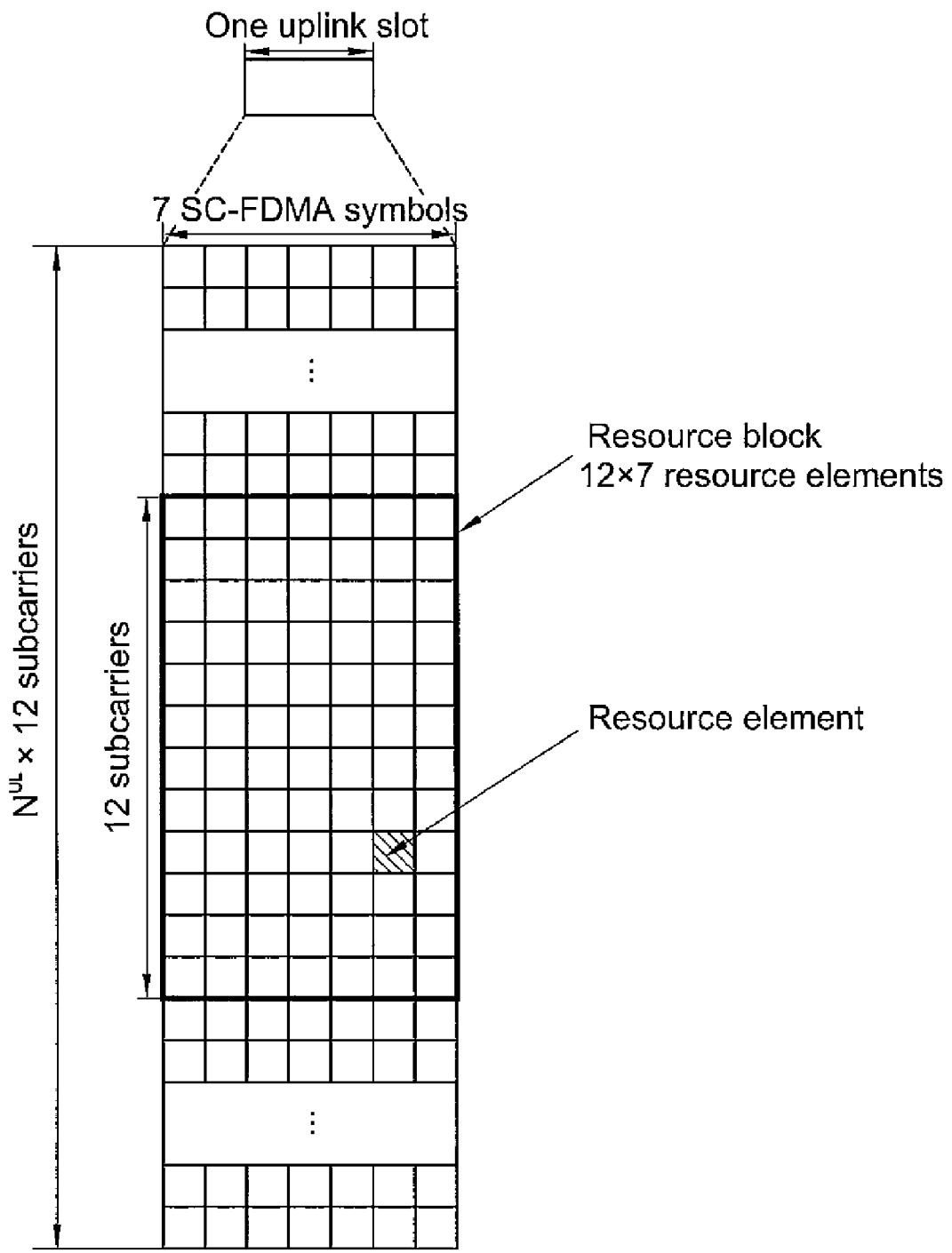
FIG. 4 is an exemplary view showing a resource grid for an uplink slot.

FIG. 4 shows a resource grid for an uplink slot.

Referring to FIG. 4, an uplink slot includes a plurality of SC-FDMA symbols in the time domain and a plurality of resource blocks in the frequency domain. Here, it is shown that the uplink slot includes seven SC-FDMA symbols, and a resource block includes twelve subcarriers, but those are merely examples, and the present invention is not limited thereto.

Each element of the resource grid is called a resource element. A single resource block includes 12×7 resource elements. The number ($N^{UL}$) of resources blocks included in the uplink slot depends on an uplink transmission bandwidth.

Figure 5:
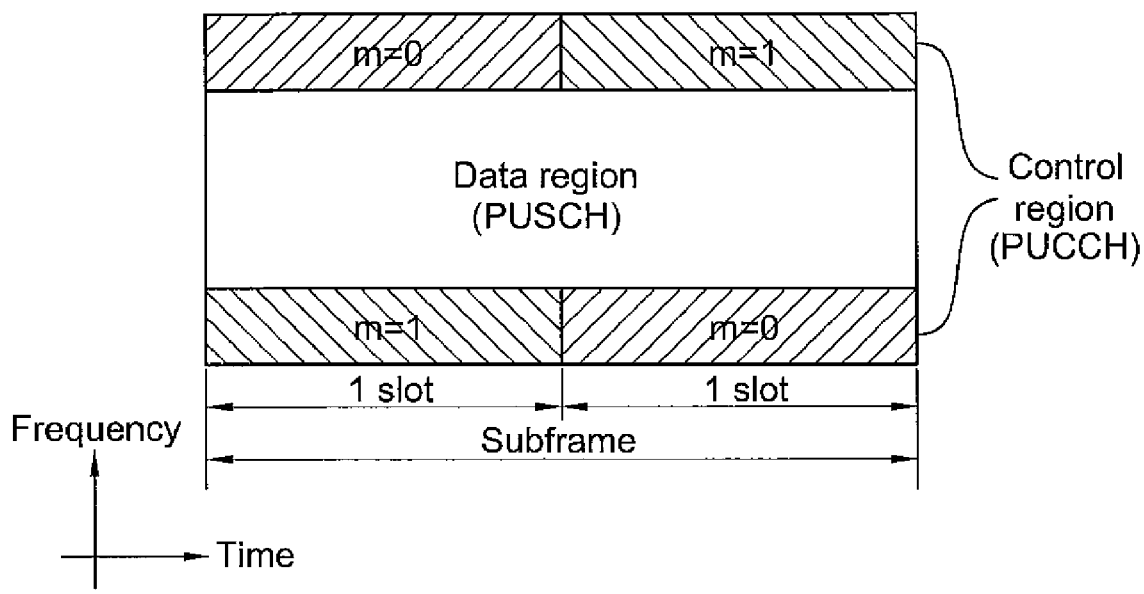
FIG. 5 shows the structure of an uplink sub-frame.

FIG. 5 shows the structure of an uplink subframe.

With reference to FIG. 5, an uplink subframe may be divided into two parts: a control region and a data region. A middle portion of the subframe is allocated to the data region, and both side portions of the data region are allocated to the control region. The control region is a region for transmitting control signals, which is typically allocated to a control channel. The data region is a region for transmitting data, which is typically allocated to a data channel. A channel allocated to the control region is called a physical uplink control channel (PUCCH), and a channel allocated to the data region is called a physical uplink shared channel (PUSCH). A UE cannot simultaneously transmit the PUCCH and the PUSCH.

The control signal includes an ACK (Acknowledgement)/NACK (Negative-Acknowledgement) signal which is an hybrid automatic repeat request (HARQ) feedback for downlink data, a channel quality indicator (CQI) indicating a downlink channel condition, a scheduling request signal which is used to request an uplink radio resource, or the like.

The PUCCH uses a single resource block that occupies mutually different frequencies in each of two slots of a subframe. Two resource blocks allocated to the PUCCH is frequency-hopped at a slot boundary. Here, it is illustrated that two PUCCHs, one having m=0 and another having m=1, are allocated to a subframe, but a plurality of PUCCHs may be allocated to a subframe.

II. Zadoff-Chu (ZC) Sequence

A Zadoff-Chu (ZC) sequence is commonly used in a wireless communication because it has good CM characteristics and correlation characteristics. The ZC sequence is one of constant amplitude and zero auto correlation (CAZAC) based sequences. The ZC sequence has idealistic characteristics with a constant amplitude at both time and frequency domains through DFT (or IDFT) and a periodic auto-correlation in the form of impulse. Thus, application of the ZC sequence to DFT-based SC-FDMA or OFDMA shows very good PAPR (or CM) characteristics.

A generating equation of a ZC sequence with a length of $N_{ZC}$ is as follows:

$$x_u(m) = \begin{cases} e^{-j\frac{\pi u m(m+1)}{N_{ZC}}} & \text{for odd } N_{Zc} \\ e^{-j\frac{\pi u m^2}{N_{ZC}}} & \text{for even } N_{Zc} \end{cases} \quad \text{[Equation 1]}$$

where $0 \leq m \leq N_{ZC}-1$, and 'u' denotes a root index which is a natural number not larger than $N_{ZC}$. The root index u is relatively prime with $N_{ZC}$. It means that when $N_{ZC}$ is determined, the number of root indexes becomes the number of available root ZC sequences. Accordingly, when the $N_{ZC}$ is a prime number, the largest number of root ZC sequences can be obtained. For example, if $N_{ZC}$ is 12 which is a composite number, the number of available root ZC sequences is 4 (u=1, 5, 7, 11). If $N_{ZC}$ is 13 which is a prime number, the number of available root ZC sequences is 12 (u=1, 2, ..., 10).

In general, a ZC sequence having the length of a prime number has better CM or correlation characteristics than those of a ZC sequence having the length of a composite number. Based on this fact, there are two methods for increasing the number of ZC sequences when the length of the ZC sequences desired to be generated is not a prime number: One is a method based on a cyclic extension and the other is a method based on truncation.

Figure 6:
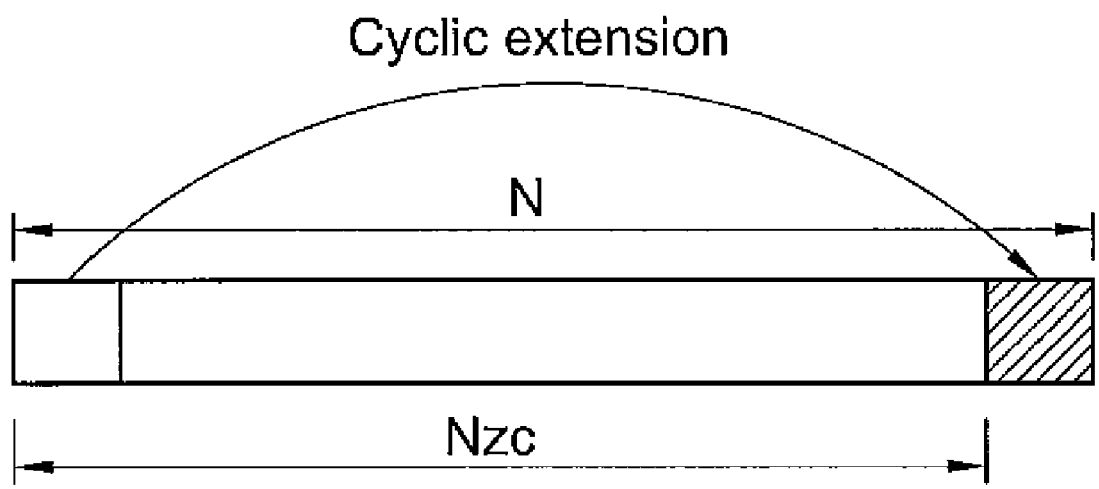
FIG. 6 is a conceptual view showing cyclic extension.

FIG. 6 is a conceptual view showing the cyclic extension method. The cyclic extension method refers to a method in which (1) when the length of desired ZC sequences is 'N', (2) the ZC sequences are generated by selecting a prime number smaller than the desired length N as $N_{ZC}$, and (3) the generated ZC sequences are cyclically extended to the remaining portion ($N-N_{ZC}$) to generate ZC sequences with the length N. For example, if N is 12, $N_{ZC}$ is selected to be 11 to obtain all the 10 cyclic-extended ZC sequences.

By using the ZC sequence $x_u(\text{in})$ of Equation 1, the cyclic-extended sequences $r_{CE}(n)$ can be expressed as shown below:

$$r_{CE}(n) = x_u(n \bmod N_{ZC}) \quad \text{[Equation 2]}$$

where $0 \leq n \leq N-1$, 'a mod b' denotes a modulo operation, which means a residual obtained by dividing 'a' by 'b', and $N_{ZC}$ denotes the largest prime number among natural numbers not larger than N.

Figure 7:
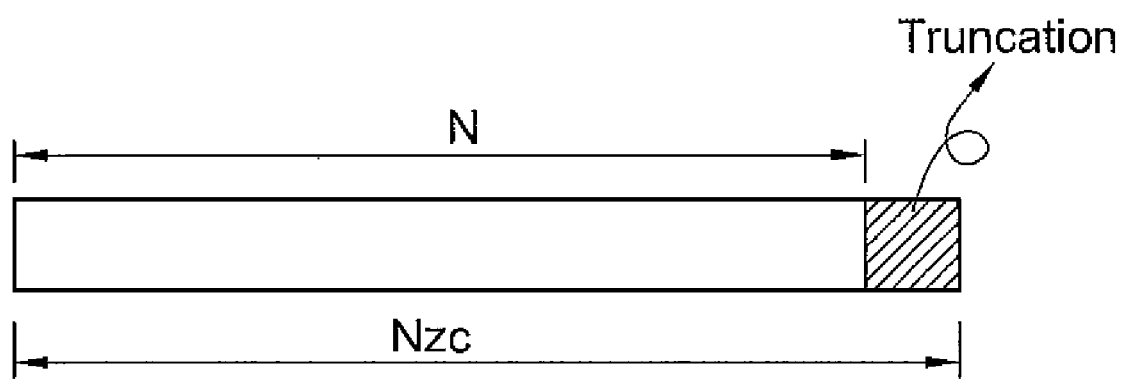
FIG. 7 shows a truncation method.

FIG. 7 is a conceptual view showing a truncation method. The truncation method refers to a method in which (1) when the length of desired ZC sequences is N, (2) a prime number larger than the desired length N is selected as $N_{ZC}$ to generate ZC sequences, and (3) the remaining portion ($N_{ZC}-N$) is truncated to generate ZC sequences with the length N. For example, if N is 12, $N_{ZC}$ is selected to be 13 to obtain all the twelve truncated ZC sequences.

By using the ZC sequence $x_u(m)$ of Equation 1, the truncated and generated sequences $r_{TR}(n)$ can be expressed as shown below:

$$r_{TR}(n) = x_u(n) \quad \text{[Equation 3]}$$

where $0 \leq n \leq N-1$, and $N_{ZC}$ denotes the smallest prime number among natural numbers of not smaller than N.

When sequences are generated by using the above-described ZC sequences, the number of available sequences is maximized when $N_{ZC}$ is a prime number. For example, if the length N of desired sequences is 11, when ZC sequences of $N_{ZC}=11$ is generated, the number of available sequences is a maximum 10. If the amount of required information or the number of used sequences should be more than ten sequences, the ZC sequence cannot be used.

If the length of desired sequences is N=12, $N_{ZC}=11$ is selected and the cyclic extension is performed or $N_{ZC}=13$ is selected and truncation is performed to thereby generate ten ZC sequences in case of the cyclic extension and twelve ZC sequences in case of the truncation. In this case, however, if more sequences are required (e.g., 30 sequences), ZC sequences having such good characteristics as satisfying the sequences cannot be generated.

In particular, if sequences having good CM characteristics are required, the number of available sequences may be severely reduced. For example, preferably, sequences used for a reference signal is lower than a CM value in quadrature phase shift keying (QPSK) transmission when power boosting is considered. When SC-FDMA scheme is used, a CM value in QPSK transmission is 1.2 dB. If sequences satisfying the QPSK CM requirements are selected from among the available ZC sequences, the number of available sequences to be used for the reference signal would be reduced. In detail, the below table shows CM values of sequences generated after being cyclic-extended by selecting $N_{ZC}=1$ in case where the length of desired sequences is N=12.

TABLE 1

| Sequence index | u | CM [dB] |
|---|---|---|
| 0 | 1 | 0.17 |
| 1 | 2 | 1.32 |
| 2 | 3 | 1.50 |
| 3 | 4 | 0.85 |
| 4 | 5 | 0.43 |
| 5 | 6 | 0.43 |
| 6 | 7 | 0.85 |
| 7 | 8 | 1.50 |
| 8 | 9 | 1.32 |
| 9 | 10 | 0.17 |

As noted in the above table, if a threshold value is 1.2 dB, the requirements of QPSK CM, the number of available sequences is reduced from ten to six (u=0, 4, 5, 6, 7, 10).

Therefore, a method of generating a sequence that may have good CM and correlation characteristics and can reduce the memory capacity required for generating or storing available sequences is required.

III. Sequence Generating Equation

A closed-form generating equation for generating sequences having good CM and correlation characteristics is a polynomial expression with a uniform size and a k-th order phase component.

The closed-form generating equation with respect to a sequence r(n) is as follows:

$$r(n)=x_u(n),\ 0\leq n\leq N-1,\ x_u(m)=e^{-j(u_0 m^k + u_1 m^{k-1} + \ldots + u_{k-1} m^1 + u_k)} \quad \text{[Equation 4]}$$

where m=0, 1, . . . , N−1, "N" denotes the length of the sequence r(n), and $u_0, u_1, \ldots, u_k$ denote arbitrary real numbers. $x_u(m)$ is a base sequence for generating the sequence r(n). 'u' is a value representing a sequence index and is in a one-to-one mapping relation with the combination of $u_0, u_1, \ldots, u_k$.

Here, $u_k$ is a component for shifting the phase of the entire sequences and gives no effect in generating the sequences. Thus, Equation 4 may be expressed by the following form:

$$r(n)=x_u(n),\ 0\leq n\leq N-1,\ x_u(m)=e^{-j(u_0 m^k + u_1 m^{k-1} + \ldots + u_{k-1} m^1)} \quad \text{[Equation 5]}$$

In a difference example, a closed-form generating equation with respect to a sequence r(n) obtained by approximating or quantizing a phase value in the sequence of Equation 4 can be expressed as follows:

$$r(n)=x_u(n),\ 0\leq n\leq N-1,\ x_u(m)=e^{j*quan(u_0 m^k + u_1 m^{k-1} + \ldots + u_{k-1} m^1 + u_k)} \quad \text{[Equation 6]}$$

where m=0, 1, . . . , N−1, 'N' denotes the length of the sequence r(n), and $u_0, u_1, \ldots, u_k$ denote arbitrary real numbers. quan(.) denotes a quantization function which means approximating or quantizing to a particular value.

A real value and an imaginary value of the results of the sequence in Equation 6 may be approximated/quantized as shown below:

$$r(n) = x_u(n),\ 0 \leq n \leq N - 1,$$

$$x_u(m) = \frac{1}{\sqrt{p_n}} quan\left(e^{-j(u_0 m^k + u_1 m^{k-1} + \ldots + u_{k-1} m^1 + u_k)}\right) \quad \text{[Equation 7]}$$

where m=0, 1, . . . , N−1, and $p_n$ denotes a normalization factor for regulating the amplitude of a generated sequence.

In Equation 6, values on a complex unit circle that a $e^{-j\theta}$ may have are quantized to Nq number. The quantized values can be approximated to the coordinates of QPSK {0.7071+j0.7071, 0.7071−j0.7071, −0.7071+j0.7071), −0.7071−j0.7071}, or approximated to {exp(−j*2*π*0/8), exp(−j*2*π*1/8), exp(−j*2*π*2/8), exp(−j*2*π*3/8), exp(−j*2*π*4/8), exp(−j*2*π*5/8), exp(−j*2*π*6/8), exp(−j*2*π*7/8)} in the form of 8-PSK.

In this case, according to the approximating methods, the values can be approximated to the closest values, to the same or the closest small values, or to the same or the closest large values.

In Equation 7, a real value and an imaginary value generated from the value of exponential function are approximated to the closest particular constellation. That is, for example, they are approximated to M-PSK or M-QAM. In addition, the real value and the imaginary value may be approximated to {+1, −1, 0} through a sign function which outputs the sign of the value.

In Equations 6 and 7, in order to approximate to the closest QPSK, the value $u_k$ may be set to be n*1/4. In addition, a round function signifying rounding as a particular form of the quantization function may be used. The quantization function may be used at a phase portion of an exponential function or at the entire exponential function.

Variables may be set according to a particular criterion to generate sequences from the generating equations. The criterion may consider CM or correlation characteristics. For example, a CM value and a threshold of cross-correlation may be set to generate sequences.

A detailed generating equations for generating sequences from the above-described general generating equations will now be described.

First Embodiment

Simple Polynomial Expression form (k=3)

The following generating equation may be selected:

$$r(n)=x_u(n),\ 0\leq n\leq N-1,\ x_u(m)=e^{-j(u_0 m^3 + u_1 m^2 + u_2 m^1)} \quad \text{[Equation 8]}$$

where m=0, 1, . . . , N−1, "N" denotes the length of the sequence r(n), and $u_0, u_1, u_2$ denote arbitrary real numbers.

Second Embodiment

Modified ZC Sequence

The following generating equation may be selected:

$$r(n) = x_u(n),\ 0 \leq n \leq N - 1,$$

$$x_u(m) = e^{-j\frac{\pi(u_0 m^k + u_1 m^{k-1} + \ldots + u_{k-1} m^1)}{N}} \quad \text{[Equation 9]}$$

where m=0, 1, ..., N−1, 'N' denotes the length of the sequence r(n), and $u_0, u_1, \ldots, u_{k-1}$ denote arbitrary real numbers.

This generating equation has the following advantages. Firstly, ZC sequences having good characteristics that can be created with the length N can be included in an available sequence set. For example, if k=2, $u_1=0$ and $u_0$ is an integer, it is equivalent to ZC sequences when N in Equation 1 is an even number. If k=2, $u_1$ and $u_0$ are integers, and $u_1=u_0$, it is equivalent to ZC sequences when N in Equation 1 is an odd number. Second, sequences having good characteristics as close as the Euclidean distance of original optimized ZC sequences.

Third Embodiment

Cyclic Extended Corrected ZC Sequence

The following generating equation may be selected:

$$r(n) = x_u(n \bmod N_{zc}), \ 0 \leq n \leq N-1, \quad \text{[Equation 10]}$$
$$x_u(m) = e^{-j\frac{\pi(u_0 m^k + u_1 m^{k-1} + \ldots + u_{k-1} m^1)}{N_{ZC}}}$$

Where m=0, 1, ..., N−1, N denotes the length of the sequence r(n), and $u_0, u_1, \ldots, u_{k-1}$ denote arbitrary real numbers. $N_{ZC}$ is the largest prime number among natural numbers smaller than N. This generating equation is advantageous in that an existing ZC sequence can be included in an available sequence set. For example, if k=2, $u_1$ and $u_0$ are integers, and $u_1=u_0$, it is equivalent to a value obtained by cyclic extending the ZC sequence.

Fourth Embodiment

Truncated Modified ZC Sequence

The following generating equation may be selected:

$$r(n) = x_u(n), \ 0 \leq n \leq N-1, \quad \text{[Equation 11]}$$
$$x_u(m) = e^{-j\frac{\pi(u_0 m^k + u_1 m^{k-1} + \ldots + u_{k-1} m^1)}{N_{zc}}}$$

where m=0, 1, ..., N−1, N denotes the length of the sequence r(n) and $u_0, u_1, \ldots, u_{k-1}$ denote arbitrary real numbers. $N_{ZC}$ is the largest prime number among natural numbers larger than N. This generating equation is advantageous in that an existing ZC sequence can be included in an available sequence set. For example, if k=2, and $u_1$ and $u_0$ are integers, it is equivalent to a value obtained by truncating the ZC sequence.

Fifth Embodiment

Modified ZC Sequence Having a Restriction

The following generating equation may be selected;

$$r(n) = x_u(n), \ 0 \leq n \leq N-1, \quad \text{[Equation 12]}$$
$$x_u(m) = e^{-j\frac{\pi a(u_0 m^k + u_1 m^{k-1} + \ldots + u_{k-1} m^1)}{N}}$$

where m=0, 1, ..., N−1, N denotes the length of the sequence r(n), $u_0, u_1, \ldots, u_{k-1}$ denote arbitrary integers, and 'a' denotes an arbitrary real number. 'a' serves to restrict granularity of the variables $u_0, u_1, \ldots, u_{k-1}$. Because the granularity of the variables $u_0, u_1, \ldots, u_{k-1}$ can be changed into the unit of integer through such restriction, a memory required for storing sequence information can be reduced.

Sixth Embodiment

Modified ZC Sequence Having Two Restrictions

The following generating equation may be selected:

$$r(n) = x_u(n), \ 0 \leq n \leq N-1, \quad \text{[Equation 13]}$$
$$x_u(m) = e^{-j\frac{\pi a(b_0 u_0 m^k + b_1 u_1 m^{k-1} + \ldots + b_{k-1} u_{k-1} m^1)}{N}}$$

where m=0, 1, ..., N−1, N denotes the length of the sequence r(n), $u_0, u_1, \ldots, u_{k-1}$ denote arbitrary integers, 'a' denotes an arbitrary real number, and $b_0, b_1, \ldots, b_{k-1}$ denote arbitrary real numbers. 'a' serves to restrict granularity of the variables $u_0, u_1, \ldots, u_{k-1}$. It may differently restrict the variables through $b_0, b_1, \ldots, b_{k-1}$. A memory required for storing sequence information can be reduced by changing the granularity of the variables $u_0, u_1, \ldots, u_{k-1}$ into the unit of integer through the two restrictions, and a sequence of better characteristics can be obtained by adjusting the granularity by variables.

Seventh Embodiment

Modified ZC Sequence (k=3) Having Two Restrictions

The following creation formula can be selected:

$$r(n) = x_u(n), \ 0 \leq n \leq N-1, \quad \text{[Equation 14]}$$
$$x_u(m) = e^{-j\frac{\pi a(b_0 u_0 m^3 + b_1 u_1 m^2 + b_2 u_2 m^1)}{N}}$$

where m=0, 1, ..., N−1, N denotes the length of the sequence r(n), $u_0, u_1, u_2$ denote arbitrary integers, 'a' denotes an arbitrary real number, and $b_0, b_1, b_2$ denote arbitrary integers. 'a' serves to restrict granularity of the variables $u_0, u_1, u_2$. It may differently restrict the variables through $b_0, b_1, b_2$.

Eighth Embodiment

Modified ZC Sequence Having One Restriction and Cyclic Extension

The following generating equation may be selected:

$$r(n) = x_u(n \bmod N_{ZC}), \ 0 \leq n \leq N-1, \quad \text{[Equation 15]}$$
$$x_u(m) = e^{-j\frac{\pi a(u_0 m^k + u_1 m^{k-1} + \ldots + u_{k-1} m^1)}{N_{ZC}}}$$

where m=0, 1, ..., $N_{ZC}$−1, N denotes the length of the sequence r(n), $u_0, u_1, \ldots, u_{k-1}$ denote arbitrary integers, 'a' denotes an arbitrary real number, and $N_{ZC}$ denotes the largest prime number among natural numbers smaller than 'N' 'a' serves to restrict granularity of the variables $u_0, u_1, \ldots, u_{k-1}$. Because the granularity of the variables $u_0, u_1, \ldots, u_{k-1}$ can be changed into the unit of integer through such restriction, a memory required for storing sequence information can be reduced.

Ninth Embodiment

Modified ZC Sequence Having Two Restrictions and Cyclic Extension

The following generating equation may be selected:

$$r(n) = x_u(n \bmod N_{ZC}), \ 0 \le n \le N - 1, \quad \text{[Equation 16]}$$

$$x_u(m) = e^{-j\frac{\pi a(b_0 u_0 m^k + b_1 u_1 m^{k-1} + \ldots + b_{k-1} u_{k-1} m^1)}{N_{ZC}}}$$

where m=0, 1, ..., $N_{ZC}$−1, N denotes the length of the sequence r(n), $u_0, u_1, \ldots, u_{k-1}$ denote arbitrary integers, 'a' denotes an arbitrary real number, $b_0, b_1, \ldots, b_{k-1}$ denote arbitrary integers, and $N_{ZC}$ denotes the largest prime number among natural numbers smaller than 'N'. 'a' serves to restrict granularity of the variables $u_0, u_1, \ldots, u_{k-1}$. It may differently restrict the variables through $b_0, b_1, \ldots, b_{k-1}$. A memory required for storing sequence information can be reduced by changing the granularity of the variables $u_0, u_1, \ldots, u_{k-1}$ into the unit of integer through the two restrictions, and a sequence of better characteristics can be obtained by adjusting the granularity by variables.

10th Embodiment

Modified ZC Sequence Having Two Restrictions (k=3) and Cyclic Extension

The following generating equation may be selected:

$$r(n) = x_u(n \bmod N_{ZC}), \ 0 \le n \le N - 1, \quad \text{[Equation 17]}$$

$$x_u(m) = e^{-j\frac{\pi a(b_0 u_0 m^3 + b_1 u_1 m^2 + b_2 u_2 m^1)}{N_{ZC}}}$$

where m=0, 1, ..., N−1, N denotes the length of the sequence r(n), $u_0, u_1, u_2$ denote arbitrary integers, 'a' denotes an arbitrary real number, $b_0, b_1, b_2$ denote arbitrary integers, and $N_{ZC}$ denotes the largest prime number among natural numbers smaller than N. 'a' serves to restrict granularity of the variables $u_0, u_1, u_2$. It may differently restrict the variables through $b_0, b_1, b_2$.

11th Embodiment

Modified ZC Sequence Having One Restriction and Truncation

The following generating equation may be selected:

$$r(n) = x_u(n), \ 0 \le n \le N - 1, \quad \text{[Equation 18]}$$

$$x_u(m) = e^{-j\frac{\pi a(u_0 m^k + u_1 m^{k-1} + \ldots + u_{k-1} m^1)}{N_{ZC}}}$$

where m=0, 1, ..., $N_{ZC}$−1, N is the length of the sequence r(n) $u_0, u_1, \ldots, u_{k-1}$ are arbitrary integers, 'a' is an arbitrary real number, and $N_{ZC}$ is the largest prime number among natural numbers larger than N. 'a' serves to restrict granularity of the variables $u_0, u_1, \ldots, u_{k-1}$. Because the granularity of the variables $u_0, u_1, \ldots, u_{k-1}$ can be changed into the unit of integer through such restriction, a memory required for storing sequence information can be reduced.

12th Embodiment

Modified ZC Sequence Having Two Restrictions and Truncation

The following generating equation may be selected.

$$r(n) = x_u(n), \ 0 \le n \le N - 1, \quad \text{[Equation 19]}$$

$$x_u(m) = e^{-j\frac{\pi a(b_0 u_0 m^k + b_1 u_1 m^{k-1} + \ldots + b_{k-1} u_{k-1} m^1)}{N_{ZC}}}$$

where m=0, 1, ..., $N_{ZC}$−1, N is the length of the sequence r(n), $u_0, u_1, \ldots, u_{k-1}$ are arbitrary integers, 'a' is an arbitrary real number, $b_0, b_1, \ldots, b_{k-1}$ are arbitrary integers, and $N_{ZC}$ is the smallest prime number among natural numbers larger than N. 'a' serves to restrict granularity of the variables $u_0, u_1, \ldots, u_{k-1}$. It may differently restrict the variables through $b_0, b_1, \ldots, b_{k-1}$. A memory required for storing sequence information can be reduced by changing the granularity of the variables $u_0, u_1, \ldots, u_{k-1}$ into the unit of integer through the two restrictions, and a sequence of better characteristics can be obtained by adjusting the granularity by variables.

13th Embodiment

Modified ZC Sequence Having Two Restrictions (k=3) and Truncation

The following generating equation may be selected:

$$r(n) = x_u(n), \ 0 \le n \le N - 1, \quad \text{[Equation 20]}$$

$$x_u(m) = e^{-j\frac{\pi a(b_0 u_0 m^3 + b_1 u_1 m^2 + b_2 u_2 m^1)}{N_{ZC}}}$$

where m=0, 1, ..., $N_{ZC}$−1 N is the length of the sequence r(n), $u_0, u_1, u_2$ are arbitrary integers, 'a' is an arbitrary real number, $b_0, b_1, b_2$ are arbitrary integers, and $N_{ZC}$ is the smallest prime number among natural numbers larger than N. 'a' serves to restrict granularity of the variables $u_0, u_1, u_2$. It may differently restrict the variables through $b_0, b_1, b_2$.

14th Embodiment

Cyclic Extension in Consideration of Cyclic Shift in Time Domain

In an OFDMA system or SC-FDMA system, the number of available sequences can be increased by using cyclic shifts for each root sequence. Besides the cyclic shift, a start point for generating a sequence can be combined with a particular frequency index so as to be defined. This is a restriction of forcibly adjusting start points overlapped by different sequences in the frequency domain, having an advantage in that the correlation characteristics of the modified ZC sequence having one or more restrictions can be supported as it is.

For example, the following sequence generating equation may be selected:

$$r(n) = e^{j\alpha n}x_u((n+\theta) \bmod N_{ZC}), 0 \leq n \leq N-1,\quad \text{[Equation 21]}$$

$$x_u(m) = e^{-j\frac{\pi a\left(u_0 m^k + u_1 m^{k-1} + \ldots + u_{k-1} m^1\right)}{N_{ZC}}}$$

where m=0, 1, ..., $N_{ZC}$−1, N is the length of the sequence r(n), $u_0, u_1, \ldots, u_{k-1}$, are arbitrary integers, 'a' is an arbitrary real number, and $N_{ZC}$ is the largest prime number among natural numbers smaller than N. $e^{j\alpha n}$ is an expression, in the frequency domain, of performing cyclic shift by 'α' at the time domain. θ is a shift offset value and indicates performing of cyclic extension after shifting by θ. If Equation 21 is expressed in the frequency domain, θ indicates a shift value of a frequency index.

For another example, the following sequence generating equation may be selected:

$$r(n) = e^{j\alpha n}x_u((n+\theta) \bmod N_{ZC}), 0 \leq n \leq N-1,\quad \text{[Equation 22]}$$

$$x_u(m) = e^{-j\frac{\pi a\left(b_0 u_0 m^k + b_1 u_1 m^{k-1} + \ldots + b_{k-1} u_{k-1} m^1\right)}{N_{ZC}}}$$

where m=0, 1, ..., $N_{ZC}$−1, N is the length of the sequence r(n), $u_0, u_1, \ldots, u_{k-1}$ are arbitrary integers, 'a' is an arbitrary real number, $b_0, b_1, \ldots, b_{k-1}$ are arbitrary integers, and $N_{ZC}$ is the largest prime number among natural numbers smaller than N. $e^{j\alpha n}$ is an expression, in the frequency domain, of performing cyclic shift by 'α' at the time domain. θ is a shift offset value and indicates performing of cyclic extension after shifting by θ.

For a still another example, the following sequence generating equation may be selected:

$$r(n) = e^{j\alpha n}x_u((n+\theta) \bmod N_{ZC}), 0 \leq n \leq N-1,\quad \text{[Equation 23]}$$

$$x_u(m) = e^{-j\frac{\pi a\left(b_1 u_0 m^3 + b_1 u_1 m^2 + b_2 u_2 m^1\right)}{N_{ZC}}}$$

where m=0, 1, ..., $N_{ZC}$−1, N is the length of the sequence r(n), $u_0, u_1, u_2$ are arbitrary integers, 'a' is an arbitrary real number, $b_0, b_1, b_2$ are arbitrary integers and $N_{ZC}$ is the largest prime number among natural numbers smaller than N. $e^{j\alpha n}$ is an expression, in the frequency domain, of performing cyclic shift by 'α' at the time domain. θ is a shift offset value.

15th Embodiment

Truncation in Consideration of Cyclic Shift in Time Domain

For example, the following sequence generating equation may be selected:

$$r(n) = e^{j\alpha n}x_u(n), 0 \leq n \leq N-1,\quad \text{[Equation 24]}$$

$$x_u(m) = e^{-j\frac{\pi a\left(u_0 m^k + u_1 m^{k-1} + \ldots + u_{k-1} m^1\right)}{N_{ZC}}}$$

where m=0, 1, ..., $N_{ZC}$−1, N is the length of the sequence r(n) $u_0, u_1, \ldots, u_{k-1}$ are arbitrary integers, 'a' is an arbitrary real number, and $N_{ZC}$ is the largest prime number among natural numbers smaller than N. $e^{j\alpha n}$ is an expression, in the frequency domain, of performing cyclic shift by 'α' at the time domain.

For another example, the following sequence generating equation may be selected.

$$r(n) = e^{j\alpha n}x_u(n), 0 \leq n \leq N-1,\quad \text{[Equation 25]}$$

$$x_u(m) = e^{-j\frac{\pi a\left(b_0 u_0 m^k + b_1 u_1 m^{k-1} + \ldots + b_{k-1} u_{k-1} m^1\right)}{N_{ZC}}}$$

For a still another example, the following sequence generating equation may be selected.

$$r(n) = e^{j\alpha n}x_u(n), 0 \leq n \leq N-1,\quad \text{[Equation 26]}$$

$$x_u(m) = e^{-j\frac{\pi a\left(b_1 u_0 m^3 + b_1 u_1 m^2 + b_2 u_2 m^1\right)}{N_{ZC}}}$$

In Equation 26, if k=3, a=0.125, $b_0$=2, and $b_1=b_2=1$=1, then the following equation can be obtained.

$$r(n) = e^{j\alpha n}x_u(n), 0 \leq n \leq N-1,\quad \text{[Equation 27]}$$

$$x_u(m) = e^{-j\frac{\pi 0.125\left(2u_0 m^3 + u_1 m^2 + u_2 m^1\right)}{N_{ZC}}}$$

IV. Generation of Sequence

In order to show an example of generating a sequence, the following sequence generating equation is considered:

$$r(n) = x_u((n+\theta) \bmod N_{ZC}), 0 \leq n \leq N-1,\quad \text{[Equation 28]}$$

$$x_u(m) = e^{-j\frac{\pi 0.125\left(2u_0 m^3 + u_1 m^2 + u_2 m^1\right)}{N_{ZC}}}$$

where m=0, 1, ..., $N_{ZC}$−1, N is the length of the sequence r(n), $u_0, u_1, u_2$ are arbitrary integers, E is a shift offset value, and $N_{ZC}$ is the largest prime number among natural numbers smaller than N. This Equation is obtained by defining α=0, k=3, a=0.125, $b_0$=2, $b_1=b_2$=1. The reason of selecting a=0.125 is to reduce the amount of calculation. Namely, because 0.125 is ⅛, it can be implemented by three times of bit shifting operation, The variables $u_0, u_1, u_2$ are determined by using a CM and a threshold value of cross-correlation.

First, generation of a sequence with a length of N=12 will now be described.

When a CM reference was set as 1.2 dB and the threshold of cross-correlation was set as 0.6, the values of the variables $u_0, u_1, u_2$ and CMs of corresponding sequences obtained from the generating equation are as shown in below table.

TABLE 2

| Sequence Index | $u_0$ | $u_1$ | $u_2$ | CM [dB] |
|---|---|---|---|---|
| 0 | 0 | 9 | 8 | 0.17 |
| 1 | 0 | 32 | 32 | 0.85 |
| 2 | 0 | 40 | 40 | 0.43 |
| 3 | 0 | 48 | 48 | 0.43 |
| 4 | 0 | 56 | 56 | 0.85 |
| 5 | 0 | 80 | 80 | 0.17 |

TABLE 2-continued

| Sequence Index | $u_0$ | $u_1$ | $u_2$ | CM [dB] |
|---|---|---|---|---|
| 6 | 0 | 19 | 10 | 1.08 |
| 7 | 0 | 26 | 0 | 1.12 |
| 8 | 0 | 61 | 0 | 0.87 |
| 9 | 0 | 68 | 3 | 1.18 |
| 10 | 1 | 78 | 22 | 1.11 |
| 11 | 2 | 25 | 60 | 0.99 |
| 12 | 3 | 62 | 2 | 1.15 |
| 13 | 3 | 73 | 4 | 1.15 |
| 14 | 3 | 80 | 37 | 1.10 |
| 15 | 4 | 82 | 8 | 1.18 |
| 16 | 11 | 38 | 86 | 1.18 |
| 17 | 12 | 65 | 75 | 1.12 |
| 18 | 14 | 73 | 52 | 1.20 |
| 19 | 16 | 83 | 61 | 1.05 |
| 20 | 18 | 34 | 11 | 1.11 |
| 21 | 18 | 50 | 41 | 1.16 |
| 22 | 22 | 17 | 44 | 0.88 |
| 23 | 25 | 61 | 36 | 1.14 |
| 24 | 25 | 88 | 11 | 1.17 |
| 25 | 27 | 39 | 5 | 1.12 |
| 26 | 32 | 23 | 85 | 1.12 |
| 27 | 34 | 17 | 52 | 1.10 |
| 28 | 38 | 36 | 31 | 1.04 |
| 29 | 40 | 6 | 8 | 1.18 |

In the above table, sequences of the index 0 to 5 refer to a set of sequences satisfying the CM reference, among ZC sequences generated by applying the conventional cyclic extension.

Table 3 shows real number values of sequences generated from Table 2, and Table 4 shows imaginary number values of sequences generated from Table 2.

TABLE 3

| Sequence index | n | | | | | | | | | | | |
|---|---|---|---|---|---|---|---|---|---|---|---|---|
| 0 | 1 | 0.84125 | −0.14231 | −0.95949 | 0.64125 | −0.65486 | 0.84125 | −0.95949 | −0.14231 | 0.84125 | 1 | 1 |
| 1 | 1 | −0.65486 | 0.84125 | 0.41542 | −0.65486 | −0.95949 | −0.65486 | 0.41542 | 0.84125 | −0.65486 | 1 | 1 |
| 2 | 1 | −0.95949 | −0.65486 | −0.14231 | −0.95949 | 0.41542 | −0.95949 | −0.14231 | −0.65486 | −0.95949 | 1 | 1 |
| 3 | 1 | −0.96949 | −0.65486 | −0.14231 | −0.95949 | 0.41542 | −0.95949 | −0.14231 | −0.65486 | −0.95949 | 1 | 1 |
| 4 | 1 | −0.65486 | 0.84125 | 0.41542 | −0.65486 | −0.95949 | −0.65486 | 0.41542 | 0.84125 | −0.65486 | 1 | 1 |
| 5 | 1 | 0.84125 | −0.14231 | −0.95949 | 0.64125 | −0.65486 | 0.84125 | −0.95949 | −0.14231 | 0.64125 | 1 | 1 |
| 6 | 1 | 0.51027 | −0.95949 | 0.62747 | 0.95949 | 0.99427 | 0.14231 | −0.38268 | −0.65486 | −0.03569 | −0.65486 | 1 |
| 7 | 1 | 0.59928 | −0.84125 | −0.47925 | −0.65486 | −0.34946 | −0.41542 | 0.071339 | −0.95949 | 0.97715 | 0.14231 | 1 |
| 8 | 1 | −0.57032 | −0.75575 | 0.73189 | −0.95949 | −0.51027 | −0.98982 | 0.99427 | 0.41542 | 0.89423 | −0.54064 | 1 |
| 9 | 1 | −0.62142 | −0.87768 | −0.98411 | 0 | −0.03569 | 0.99745 | 0.94883 | 0.65486 | −0.94883 | 0.34946 | 1 |
| 10 | 1 | −0.67768 | 0.75575 | −0.47925 | −0.41542 | 0.70711 | 0.54064 | −0.99745 | 0.41542 | −0.34946 | 0.90963 | 1 |
| 11 | 1 | −0.99936 | −0.90963 | 0.86001 | 0.64125 | 0.62142 | 0.90963 | 0.62747 | −0.95949 | 0.62747 | −0.54064 | 1 |
| 12 | 1 | −0.60054 | −0.28173 | 0.70711 | 0.65486 | 0.70711 | 0.75575 | 0.97715 | 0.84125 | −0.99745 | −0.90963 | 1 |
| 13 | 1 | −0.98411 | 0.98982 | −0.17755 | 0.64125 | −0.03569 | −0.90963 | 0.44762 | 0.41542 | −0.57032 | 0.28173 | 1 |
| 14 | 1 | −0.3158 | −0.99745 | −0.62747 | −0.28173 | −0.44762 | 0.99745 | −0.92388 | 0.14231 | −0.92388 | −0.59928 | 1 |
| 15 | 1 | −0.93695 | −0.41542 | −0.93695 | −0.95949 | −0.93695 | 0.65486 | −0.07134 | −0.95949 | −0.21257 | −1 | 1 |
| 16 | 1 | 0.47925 | 0.54064 | 0.21257 | −0.84125 | −0.97715 | −0.28173 | 0.70711 | −0.14231 | 0.99745 | −0.98982 | 1 |
| 17 | 1 | 0.90963 | −0.87768 | −0.21257 | −0.54064 | −0.84125 | −0.34946 | 0.59928 | 0.65486 | 0.54064 | −0.93695 | 1 |
| 18 | 1 | 0.68142 | −0.98982 | 0.86001 | 1 | −0.1069 | 0.90963 | 0.96894 | −0.65486 | 0.1069 | −0.98982 | 1 |
| 19 | 1 | 1 | 0.97715 | 0.34969 | −0.90963 | 0 | −0.47925 | 0.80054 | 0.95949 | 0.65486 | −0.93695 | 1 |
| 20 | 1 | −0.96894 | −0.97715 | −0.94883 | −0.90963 | −0.24731 | −0.99745 | 0.92388 | −0.84125 | −0.44762 | −0.99745 | 1 |
| 21 | 1 | −0.17755 | 0.071339 | 0.17755 | −0.90963 | 0.51027 | 0.34946 | −0.24731 | 0.14231 | 0.17755 | −0.21257 | 1 |
| 22 | 1 | −0.62142 | 0.75575 | −0.68142 | −0.95949 | 0.86001 | 0.98982 | 0.1069 | 0.41542 | −0.44762 | 0.54064 | 1 |
| 23 | 1 | 0.51027 | 0.90963 | −0.62142 | −0.95949 | 0.3158 | 0.90963 | 0.62747 | −0.14231 | 0.99427 | 0.28173 | 1 |
| 24 | 1 | 0.57032 | −0.80054 | −0.62747 | −0.90963 | −0.44762 | −0.07134 | −0.73189 | 0.95949 | 0.61027 | −0.21257 | 1 |
| 25 | 1 | −0.93695 | −0.80054 | −0.65486 | −0.28173 | 0.97715 | −0.87768 | −0.28173 | −1 | 0.70711 | −0.07134 | 1 |
| 26 | 1 | 0.98982 | −0.80054 | −0.93695 | −0.28173 | 0.65486 | 0.59928 | −0.99745 | −0.84125 | 0.98982 | −0.97715 | 1 |
| 27 | 1 | 0.17755 | 0.90963 | 0.38268 | −0.95949 | 0.38268 | −0.28173 | −0.44762 | −0.65486 | 0.62747 | 0.98982 | 1 |
| 28 | 1 | 0.38268 | −0.70711 | 0.96411 | −0.75575 | 0.98411 | −0.34946 | −0.68142 | −0.84125 | 0.94883 | 0.97715 | 1 |
| 29 | 1 | −0.97715 | 0.65486 | −0.21257 | 0.41542 | 0.60054 | −0.41542 | 0.80054 | −0.14231 | −0.97715 | −0.84125 | 1 |

TABLE 4

| Sequence index | n | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 0 | 0 | −0.54064 | −0.98982 | 0.26173 | 0.54064 | −0.75575 | 0.54064 | 0.28173 | −0.98982 | −0.54064 | 0 | 0 |
| 1 | 0 | −0.75575 | −0.54064 | −0.90963 | 0.75575 | −0.28173 | 0.75575 | −0.90963 | −0.54064 | −0.75575 | 0 | 0 |
| 2 | 0 | −0.28173 | −0.75575 | 0.98982 | 0.28173 | 0.90963 | 0.26173 | 0.98982 | −0.75575 | −0.28173 | 0 | 0 |
| 3 | 0 | 0.28173 | 0.75575 | −0.98982 | −0.28173 | −0.90963 | −0.28173 | −0.98982 | 0.75575 | 0.28173 | 0 | 0 |
| 4 | 0 | 0.75575 | 0.54064 | 0.90963 | −0.75575 | 0.28173 | −0.75575 | 0.90963 | 0.54064 | 0.75575 | 0 | 0 |
| 5 | 0 | 0.54064 | 0.98982 | −0.28173 | −0.54064 | 0.75575 | −0.54064 | −0.28173 | 0.98982 | 0.54064 | 0 | 0 |

TABLE 4-continued

| Sequence index | n | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 6 | 0 | −0.86001 | 0.28173 | −0.77864 | 0.28173 | 0.1069 | −0.98982 | 0.92388 | −0.75575 | −0.99936 | −0.75575 | 0 |
| 7 | 0 | −0.80054 | 0.54064 | −0.87768 | −0.75575 | 0.93695 | −0.90963 | −0.99745 | −0.28173 | 0.21257 | 0.98982 | 0 |
| 8 | 0 | −0.82142 | −0.65486 | −0.68142 | 0.28173 | 0.86001 | −0.14231 | 0.1069 | −0.90963 | −0.44762 | 0.84125 | 0 |
| 9 | 0 | −0.57032 | 0.47925 | 0.17755 | −1 | 0.99936 | −0.07134 | −0.3158 | 0.75575 | −0.3158 | 0.93695 | 0 |
| 10 | 0 | 0.47925 | −0.65486 | 0.87768 | −0.90963 | −0.70711 | −0.84125 | −0.07134 | −0.90963 | −0.93695 | 0.41542 | 0 |
| 11 | 0 | 0.035692 | −0.41542 | 0.51027 | −0.54064 | −0.57032 | −0.41542 | −0.77864 | −0.28173 | −0.77864 | −0.84125 | 0 |
| 12 | 0 | −0.59928 | 0.95949 | −0.70711 | 0.75575 | −0.70711 | −0.65486 | −0.21257 | −0.54064 | −0.07134 | −0.41542 | 0 |
| 13 | 0 | −0.17755 | 0.14231 | 0.98411 | 0.54064 | 0.99936 | −0.41542 | −0.89423 | −0.90963 | 0.82142 | 0.95949 | 0 |
| 14 | 0 | 0.94883 | 0.071339 | 0.77864 | −0.95949 | 0.89423 | 0.071339 | −0.38268 | −0.98982 | 0.38268 | 0.80054 | 0 |
| 15 | 0 | 0.34946 | −0.90963 | 0.34946 | 0.28173 | 0.34946 | 0.75575 | 0.99745 | −0.28173 | −0.97715 | 0 | 0 |
| 16 | 0 | 0.67768 | 0.84125 | 0.97715 | −0.54064 | −0.21257 | 0.95949 | 0.70711 | 0.98982 | −0.07134 | −0.14231 | 0 |
| 17 | 0 | 0.41542 | −0.47925 | −0.97715 | −0.84125 | −0.54064 | −0.93695 | 0.80054 | 0.75575 | −0.84125 | 0.34946 | 0 |
| 18 | 0 | 0.73189 | 0.14231 | 0.51027 | 0 | 0.99427 | −0.41542 | 0.24731 | −0.75575 | −0.99427 | 0.14231 | 0 |
| 19 | 0 | 0 | −0.21257 | −0.93695 | 0.41542 | −1 | −0.87768 | 0.59928 | −0.28173 | 0.75575 | −0.34946 | 0 |
| 20 | 0 | −0.24731 | 0.21257 | −0.3158 | −0.41542 | 0.96894 | 0.071339 | −0.38268 | 0.54064 | −0.89423 | −0.07134 | 0 |
| 21 | 0 | 0.98411 | −0.99745 | 0.98411 | 0.41542 | 0.86001 | 0.93695 | 0.96894 | 0.98982 | −0.98411 | −0.97715 | 0 |
| 22 | 0 | 0.57032 | 0.65486 | −0.73189 | 0.28173 | 0.51027 | 0.14231 | −0.99427 | −0.90963 | −0.89423 | −0.64125 | 0 |
| 23 | 0 | 0.86001 | −0.41542 | −0.57032 | 0.28173 | −0.94883 | −0.41542 | 0.77864 | −0.98982 | −0.1069 | 0.95949 | 0 |
| 24 | 0 | 0.62142 | −0.59928 | −0.77864 | −0.41542 | −0.89423 | 0.99745 | −0.68142 | 0.28173 | −0.86001 | 0.97715 | 0 |
| 25 | 0 | 0.34946 | −0.59928 | −0.75575 | −0.95949 | −0.21257 | −0.47925 | −0.95949 | 0 | 0.70711 | −0.99745 | 0 |
| 26 | 0 | 0.14231 | −0.59928 | −0.34946 | −0.95949 | −0.75575 | −0.80054 | 0.071339 | −0.54064 | −0.14231 | 0.21257 | 0 |
| 27 | 0 | 0.98411 | −0.41542 | −0.92388 | −0.28173 | −0.92388 | 0.95949 | −0.89423 | −0.75575 | −0.77664 | 0.14231 | 0 |
| 28 | 0 | 0.92388 | 0.70711 | −0.17755 | 0.65486 | 0.17755 | 0.93695 | −0.73189 | 0.54064 | 0.3158 | −0.21257 | 0 |
| 29 | 0 | 0.21257 | 0.75575 | 0.97715 | 0.90963 | 0.59928 | 0.90963 | 0.59928 | −0.98982 | 0.21257 | −0.54064 | 0 |

If N=12 and when sequences generated by the proposed generating equation and the ZC sequences generated by applying the conventional cyclic extension, six sequences satisfying QPSK CM criteria 1.2 dB are included.

Table 5 shows a comparison between the ZC sequence generated by applying the conventional cyclic extension and the proposed sequences.

TABLE 5

| | Conventional ZC sequence | Proposed Sequence |
|---|---|---|
| Num. of Sequences | 10 | 30 |
| Num. of Sequences < CM 1.2 dB | 6 | 30 |
| Max. CM [dB] | 1.50 | 1.20 |
| Max. Cross. Cor. | 0.44 | 0.60 |
| Mean Cross. Cor. | 0.25 | 0.25 |
| Median Cross. Cor. | 0.28 | 0.24 |

It is noted that, when the sequences are generated by the proposed method, the number of available sequences can be increased while the cross-correlation characteristics are substantially the same. When frequency hopping in an actual environment is considered, a block error rate (BLER) performance becomes better as a mean correlation value is lower. Because mean correlations of both sequences are the same, the BLER performance is the same.

Generation of a sequence with a length N=24 will now be described.

The below table shows variables $u_0$, $u_1$, $u_2$ obtained from the generating equation and corresponding CMs when the CM reference is set to be 1.2 dB and the threshold value of the cross-correlation is set to be 0.39.

TABLE 6

| Sequence Index | $u_0$ | $u_1$ | $u_2$ | CM [dB] |
|---|---|---|---|---|
| 0 | 0 | 8 | 8 | −0.09 |
| 1 | 0 | 32 | 32 | 0.83 |
| 2 | 0 | 48 | 48 | 0.68 |
| 3 | 0 | 64 | 64 | 0.38 |
| 4 | 0 | 72 | 72 | 0.49 |
| 5 | 0 | 88 | 88 | 0.18 |
| 6 | 0 | 96 | 96 | 0.18 |
| 7 | 0 | 112 | 112 | 0.49 |
| 8 | 0 | 120 | 120 | 0.38 |
| 9 | 0 | 136 | 136 | 0.68 |
| 10 | 0 | 152 | 152 | 0.83 |
| 11 | 0 | 176 | 176 | −0.09 |
| 12 | 0 | 6 | 17 | 1.11 |
| 13 | 0 | 6 | 182 | 0.87 |
| 14 | 0 | 25 | 16 | 1.14 |
| 15 | 0 | 29 | 82 | 0.95 |
| 16 | 0 | 35 | 132 | 0.92 |
| 17 | 0 | 44 | 27 | 0.83 |
| 18 | 0 | 48 | 4 | 1.01 |
| 19 | 0 | 54 | 18 | 1.13 |
| 20 | 0 | 54 | 122 | 1.14 |
| 21 | 0 | 58 | 0 | 1.07 |
| 22 | 0 | 64 | 14 | 0.61 |
| 23 | 0 | 68 | 21 | 0.98 |
| 24 | 0 | 88 | 11 | 0.58 |
| 25 | 0 | 96 | 116 | 0.63 |
| 26 | 0 | 112 | 0 | 0.49 |
| 27 | 0 | 126 | 133 | 1.05 |
| 28 | 0 | 130 | 15 | 1.07 |
| 29 | 0 | 178 | 39 | 1.11 |

In the above table, sequences of the sequence indexes 0 to 11 refer to a set of sequences satisfying the CM criteria among the ZC sequences generated by applying the conventional cyclic extension.

Table 7 shows real number values of the sequences generated from Table 6, and Table 8 shows imaginary values of the generated sequences.

TABLE 7

| Sequence Index | n=0 | 1 | 2 | 3 | 4 | 5 | 6 | 7 | 8 | 9 | 10 | 11 |
|---|---|---|---|---|---|---|---|---|---|---|---|---|
| 0 | 1 | 0.96292 | 0.88255 | −0.06824 | −0.91721 | −0.57888 | 0.85442 | 0.20340 | −0.91721 | 0.98292 | −0.77671 | 0.68255 |
| 1 | 1 | 0.46001 | −0.99089 | 0.98292 | −0.08524 | −0.77571 | −0.57888 | 0.88255 | −0.06824 | 0.48007 | −0.91721 | −0.99069 |
| 2 | 1 | −0.06824 | 0.20348 | −0.91721 | −0.77571 | 0.85442 | −0.99089 | −0.33488 | −0.77571 | −0.05824 | −0.57868 | 0.20348 |
| 3 | 1 | −0.57666 | 0.96292 | 0.85442 | −0.99089 | 0.20348 | −0.33488 | −0.05524 | −0.99089 | −0.57888 | 0.08255 | 0.98292 |
| 4 | 1 | −0.77571 | 0.46007 | −0.57688 | 0.85442 | 0.88255 | 0.20348 | 0.98292 | 0.85442 | −0.77671 | −0.99069 | 0.46007 |
| 5 | 1 | −0.99069 | −0.91721 | 0.88255 | 0.20348 | 0.46007 | 0.96292 | −0.77571 | 0.20348 | −0.99089 | −0.33488 | −0.91721 |
| 6 | 1 | −0.99069 | −0.91721 | 0.88255 | 0.20348 | 0.46007 | 0.96292 | −0.77571 | 0.20346 | −0.99089 | −0.33488 | −0.91721 |
| 7 | 1 | −0.77571 | 0.46007 | −0.57666 | 0.85442 | 0.88255 | 0.20348 | 0.98292 | 0.85442 | −0.77671 | −0.99089 | 0.46007 |
| 8 | 1 | −0.57668 | 0.96292 | 0.85442 | −0.99089 | 0.20348 | −0.33488 | −0.06824 | −0.99069 | −0.57688 | 0.88255 | 0.98292 |
| 9 | 1 | −0.00824 | 0.20366 | −0.91721 | −0.77571 | 0.85442 | −0.99089 | −0.33433 | −0.77571 | −0.08824 | −0.57688 | 0.20348 |
| 10 | 1 | 0.46007 | −0.89069 | 0.98262 | −0.08824 | −0.77671 | −0.57688 | 0.66255 | −0.06824 | 0.45007 | −0.91721 | −0.99089 |
| 11 | 1 | 0.96292 | 0.68255 | −0.05824 | −0.91721 | −0.67868 | 0.85442 | 0.20348 | −0.91721 | 0.96292 | −0.77571 | 0.88255 |
| 12 | 1 | 0.92388 | 0.54845 | −0.22014 | −0.94228 | −0.64424 | 0.8572 | 0.71908 | −0.85442 | −0.08627 | 0.83618 | −0.99287 |
| 13 | 1 | −0.99767 | 0.94225 | −0.68255 | 0.069242 | 0.73084 | −0.84255 | −0.06824 | 1 | 0.13817 | −0.88789 | −0.85442 |
| 14 | 1 | 0.76482 | −0.63109 | −0.0512 | −0.08524 | 0.88317 | −0.2698 | −0.86998 | −0.33488 | 0.78837 | 0.13817 | −0.31874 |
| 15 | 1 | −0.31874 | 0.088242 | −0.71908 | 0.57888 | 0.88317 | 0.46007 | −0.8799 | 0.46007 | −0.76482 | 0.77671 | 0.99838 |
| 16 | 1 | −0.95817 | 0.81697 | 0.91028 | 0.96292 | 0.47518 | −0.58769 | 0.47518 | 0.96292 | 0.91028 | 0.81697 | −0.95817 |
| 17 | 1 | 0.35092 | −0.70701 | −0.2882 | 0.2898 | −0.61775 | −0.03414 | −0.69493 | 0.088242 | −0.58285 | −0.38886 | −0.15308 |
| 18 | 1 | 0.03109 | −0.95292 | 0.2598 | 0.88255 | −0.3984 | 0.088242 | −0.97908 | −0.91721 | −0.51958 | 0.67688 | 0.81697 |
| 19 | 1 | 0.33488 | −0.3984 | −0.97908 | −0.98232 | 0.85442 | −0.88789 | −0.97908 | 0.20348 | −0.46007 | 0.51958 | −0.2898 |
| 20 | 1 | −0.99089 | −5.8E−18 | −0.3984 | −0.45007 | −0.48007 | −0.13817 | −0.89787 | 0.98292 | 0.68255 | 0.99767 | −0.81697 |
| 21 | 1 | 0.54845 | −0.68255 | −0.57188 | −0.98069 | 0.93028 | −0.46007 | −0.16891 | 0.85442 | 0.10228 | 0.068242 | 0.90307 |
| 22 | 1 | 0.23876 | 0.13617 | −0.42948 | 0.91721 | −0.97167 | −0.99757 | 0.23678 | −0.91721 | −0.90307 | 0.13817 | −0.97157 |
| 23 | 1 | 0.051199 | 0.80424 | 0.50492 | 0.3984 | 0.8267 | 0.99942 | −0.96817 | −0.20348 | −0.99287 | 0.95314 | 0.99836 |
| 24 | 1 | −0.11923 | 0.99476 | 0.051199 | 0.94228 | 0.89493 | 0.23878 | 0.89581 | −0.98292 | −0.64424 | 0.23878 | −0.08627 |
| 25 | 1 | −0.88789 | −0.48007 | −0.2688 | −0.91721 | 0.81887 | −0.20348 | 0.89707 | 0.20348 | 0.97908 | 0.068242 | 0.81908 |
| 26 | 1 | −0.33088 | 0.20316 | −0.08824 | 0.88255 | −0.77571 | 0.96292 | 0.85442 | −0.83069 | −0.57655 | −0.91721 | 0.46007 |
| 27 | 1 | −0.2662 | 0.83618 | 0.60492 | 0.88789 | −0.68898 | −0.89942 | −0.36092 | 0.33488 | 0.99838 | 0.80424 | −0.8287 |
| 28 | 1 | −0.78837 | −0.99942 | −0.31874 | 0.3934 | 0.97547 | 0.97157 | −0.8287 | 0.91721 | 0.99237 | −0.10228 | 0.35092 |
| 29 | 1 | −0.84542 | 0.60424 | −0.47618 | 0.61958 | −0.71908 | 0.95314 | −0.93841 | 0.33488 | 0.88938 | −0.90307 | −0.35092 |

| Sequence Index | n=12 | 13 | 14 | 15 | 16 | 17 | 18 | 19 | 20 | 21 | 22 | 23 |
|---|---|---|---|---|---|---|---|---|---|---|---|---|
| 0 | −0.77571 | 0.96262 | −0.91721 | 0.20348 | 0.85442 | −0.57855 | −0.81721 | −0.05824 | 0.88255 | 0.96292 | 1 | 1 |
| 1 | −0.91721 | 0.68007 | −0.06524 | 0.88255 | −0.57688 | −0.77571 | −0.06824 | 0.88292 | −0.99089 | 0.46007 | 1 | 1 |
| 2 | −0.57688 | −0.06824 | −0.77571 | −0.33488 | −0.99089 | 0.85442 | −0.77671 | −0.91721 | 0.50346 | −0.06874 | 1 | 1 |
| 3 | 0.08255 | −0.57868 | −0.99069 | −0.00824 | −0.33488 | 0.20348 | −0.99069 | 0.85442 | 0.95292 | −0.57608 | 1 | 1 |
| 4 | −0.99089 | −0.77571 | 0.85442 | 0.98292 | 0.20346 | 0.63255 | 0.85442 | −0.57668 | 0.46007 | −0.77671 | 1 | 1 |
| 5 | −0.33488 | −0.99069 | 0.20348 | −0.77571 | 0.98292 | 0.46007 | 0.20348 | 0.68255 | −0.91721 | −0.99069 | 1 | 1 |
| 6 | −0.33488 | −0.99069 | 0.20348 | −0.77571 | 0.95292 | 0.46007 | 0.20348 | 0.68255 | −0.91721 | −0.99069 | 1 | 1 |
| 7 | −0.99069 | −0.77671 | 0.85442 | 0.98292 | 0.20346 | 0.63255 | 0.85442 | −0.57688 | 0.46007 | −0.77671 | 1 | 1 |
| 8 | 0.88255 | −0.57668 | −0.99089 | −0.08824 | −0.33488 | 0.20348 | −0.89059 | 0.85442 | 0.98292 | −0.57668 | 1 | 1 |
| 9 | −0.57888 | −0.08824 | −0.77571 | −0.33468 | −0.99069 | 0.85442 | −0.77571 | −0.91721 | 0.20346 | −0.06824 | 1 | 1 |
| 10 | −0.91721 | 0.46007 | −0.06824 | 0.68255 | −0.57688 | −0.77571 | −0.08324 | 0.96292 | −0.99089 | 0.46007 | 1 | 1 |
| 11 | −0.77571 | 0.96292 | −0.91721 | 0.20348 | 0.85442 | −0.67588 | −0.81721 | −0.08824 | 0.88255 | 0.96282 | 1 | 1 |
| 12 | 0.81697 | −0.81776 | 0.64845 | −0.64424 | 0.85442 | −0.99985 | 0.75371 | 0.085268 | −0.94228 | 0.6341 | 0.83678 | 1 |
| 13 | −0.20348 | 0.3084 | 0.73084 | 0.85442 | 0.85442 | 0.73084 | 0.3984 | −0.20346 | −0.95442 | −0.83789 | 0.13617 | 1 |
| 14 | −0.33488 | 0.95817 | 0.68789 | 0.92388 | 0.85442 | −0.69493 | 0.2598 | −0.59054 | 0.98292 | 0.89493 | 0.51968 | 1 |
| 15 | 0.99069 | 0.22014 | −0.91721 | 0.89581 | −0.08324 | −0.92388 | −0.98292 | −0.414 | 0.99069 | −0.91028 | 0.98292 | 1 |
| 16 | 1 | −0.08527 | −0.51953 | 0.13871 | 0.85442 | −0.86317 | −0.13817 | 0.59054 | 0.20348 | −0.98822 | 0.88789 | 1 |
| 17 | 0.81697 | 0.5341 | −0.97157 | 0.99985 | 0.20348 | 0.31874 | 0.93028 | −0.93841 | −0.2598 | −0.11923 | −0.99478 | 1 |
| 18 | 0.85442 | 0.3084 | −0.20348 | −0.99767 | −0.91721 | 0.73084 | −0.96292 | −0.2592 | −0.77671 | 5.4E−15 | −0.86255 | 1 |
| 19 | −0.20346 | −0.91721 | −0.94228 | −1.1E−14 | −0.57688 | 0.068242 | −0.88789 | 0.81897 | −0.46007 | −0.06824 | 0.81697 | 1 |
| 20 | 0.77571 | 0.77671 | −0.81897 | 0.99787 | 0.68255 | 0.98292 | −0.98767 | −0.13817 | −0.46007 | −0.48007 | −0.3984 | 1 |
| 21 | −0.33488 | −0.6672 | 0.77571 | −0.97167 | −0.57688 | −0.95311 | 0.91721 | 0.79881 | 0.98292 | −0.99942 | −0.20346 | 1 |
| 22 | −1 | 0.75371 | −0.73054 | −0.30251 | 0.68255 | 0.63816 | 0.97908 | −0.99942 | −0.46007 | −0.99942 | 0.99767 | 1 |
| 23 | −0.2698 | 0.96241 | 0.99478 | −0.91028 | 0.20348 | −0.69493 | 0.79681 | 0.26332 | 0.94228 | −0.38288 | −0.38685 | 1 |
| 24 | 0.2698 | 0.31874 | −0.23878 | −0.01707 | −0.33488 | −0.74238 | 0.99476 | 0.78837 | 8.67E−14 | 0.38317 | −0.79881 | 1 |
| 25 | −0.57868 | 0.3984 | −0.96292 | −0.88789 | 0.46007 | 2.11E−14 | 0.33488 | 0.51958 | −0.57888 | −0.51958 | 0.33488 | 1 |
| 26 | 0.46007 | −0.91721 | −0.67658 | −0.99069 | 0.85442 | 0.95292 | −0.77571 | 0.68255 | −0.06824 | 0.20346 | −0.33488 | 1 |
| 27 | −0.63109 | −0.92388 | 0.49011 | −0.98738 | −0.91721 | 0.3287 | −0.83028 | −0.98241 | 0.3964 | −0.88317 | −0.19011 | 1 |
| 28 | −0.63109 | 0.11923 | 0.38685 | 0.8287 | 0.85442 | 0.22014 | 0.38686 | −0.31874 | 0.13964 | −0.51776 | 0.70711 | 1 |
| 29 | 0.58789 | 0.71908 | −0.23878 | −0.8789 | −0.99089 | −0.34642 | −0.70711 | −0.89493 | −0.81697 | −0.97541 | −0.9028 | 1 |

TABLE 8

| Sequence Index | n=0 | 1 | 2 | 3 | 4 | 5 | 6 | 7 | 8 | 9 | 10 | 11 |
|---|---|---|---|---|---|---|---|---|---|---|---|---|
| 0 | 0 | −0.2696 | −0.73089 | −0.99767 | −0.3984 | 0.81697 | 0.51968 | −0.97908 | 0.3984 | 0.2698 | −0.63100 | 0.73084 |
| 1 | 0 | −0.88789 | 0.13617 | −0.2698 | 0.99767 | 0.53109 | 0.81897 | 0.73084 | −0.99767 | 0.88789 | 0.3864 | −0.13617 |
| 2 | 0 | −0.99767 | 0.97908 | 0.3984 | 0.63109 | 0.51958 | −0.13617 | −0.94226 | −0.63109 | 0.99767 | −0.61597 | −0.97908 |
| 3 | 0 | −0.81697 | −0.2698 | −0.51958 | −0.13617 | −0.97908 | −0.94228 | 0.99767 | 0.13617 | 0.81697 | −0.73084 | 0.2898 |
| 4 | 0 | −0.63109 | −0.88789 | −0.81697 | 0.51958 | 0.73084 | −0.97908 | 0.2698 | −0.61958 | 0.63109 | 0.13617 | 0.88789 |
| 5 | 0 | −0.13617 | −0.3984 | 0.73084 | 0.97908 | −0.88789 | −0.2698 | −0.63109 | −0.97908 | 0.13617 | −0.94226 | 0.3984 |
| 6 | 0 | 0.13517 | 0.3984 | −0.73084 | −0.97908 | 0.88789 | 0.2896 | 0.63109 | 0.97908 | −0.13617 | 0.94225 | −0.3984 |
| 7 | 0 | 0.63109 | 0.88788 | 0.81597 | −0.61858 | −0.73084 | 0.97808 | −0.2698 | 0.51958 | −0.63109 | −0.13617 | −0.88789 |
| 8 | 0 | 0.81697 | 0.2698 | 0.51958 | 0.13817 | 0.87808 | 0.94228 | −0.99767 | −0.13817 | −0.87697 | 0.73084 | −0.2893 |
| 9 | 0 | 0.99767 | −0.97908 | −0.3989 | −0.83109 | −0.51958 | 0.13617 | 0.94228 | 0.53109 | −0.99787 | 0.81697 | 0.97903 |
| 10 | 0 | 0.88789 | −0.13617 | 0.2698 | −0.99787 | −0.63109 | −0.81697 | −0.73084 | 0.99787 | −0.88789 | −0.3984 | 0.13817 |
| 11 | 0 | 0.2698 | 0.73084 | 0.99787 | 0.3984 | −0.81897 | −0.61958 | 0.97908 | −0.3084 | −0.2598 | 0.63109 | −0.78084 |
| 12 | 0 | −0.38208 | −0.83618 | −0.97547 | −0.33488 | 0.78482 | 0.76371 | −0.89493 | −0.61958 | 0.99838 | −0.54845 | −0.11923 |
| 13 | 0 | 0.068242 | −0.33488 | 0.73089 | −0.99767 | 0.88255 | 0.33488 | −0.89767 | −2.E−16 | 0.99069 | 0.46007 | −0.51958 |
| 14 | 0 | −0.64424 | −0.77571 | 0.99269 | −0.99767 | 0.59492 | 0.96292 | 0.74238 | 0.94226 | 0.61775 | −0.99089 | 0.94784 |
| 15 | 0 | −0.94789 | 0.99767 | −0.63493 | −0.81697 | −0.60932 | −0.88789 | −0.47518 | 0.88789 | −0.64424 | −0.63109 | 0.086288 |
| 16 | 0 | −0.2862 | 0.576688 | 0.414 | 0.2698 | −0.8799 | 0.48007 | −0.8799 | 0.2898 | 0.414 | −0.57868 | −0.2882 |
| 17 | 0 | −0.93641 | 0.70711 | −0.95817 | −0.96292 | −0.78637 | 0.99942 | −0.31908 | −0.99787 | −0.8267 | 0.83028 | −0.98822 |
| 18 | 0 | −0.77571 | 0.2688 | −0.96292 | −0.73084 | −0.91721 | 0.99787 | −0.20348 | −0.3984 | 0.85442 | −0.61597 | 0.57868 |
| 19 | 0 | −0.94228 | 0.91721 | −0.20318 | 0.2698 | 0.51958 | 0.46007 | 0.20348 | 0.97508 | −0.88789 | −0.86442 | −0.96292 |
| 20 | 0 | −0.13617 | −1 | −0.91721 | 0.88789 | −0.88789 | −0.99069 | 0.088242 | −0.2698 | 0.73084 | 0.068242 | −0.57868 |
| 21 | 0 | −0.83818 | 0.73084 | −0.49011 | 0.13817 | 0.36885 | 0.88789 | 0.98548 | −0.51958 | 0.99478 | 0.99767 | −0.42915 |
| 22 | 0 | −0.97157 | 0.99069 | 0.90307 | 0.3984 | 0.23878 | −0.08824 | 0.97157 | −0.3954 | −0.42948 | 0.99089 | −0.23878 |
| 23 | 0 | −0.99869 | 0.7981 | 0.56317 | −0.91721 | 0.55265 | 0.034141 | −0.2882 | −0.97908 | −0.11923 | −0.30251 | 0.085288 |
| 24 | 0 | −0.99257 | −0.1022226 | −0.99869 | 0.33488 | −0.71908 | 0.97157 | 0.44844 | 0.2898 | 0.78432 | −0.97157 | −0.99838 |
| 25 | 0 | 0.46007 | 0.88789 | −0.88292 | −0.3988 | −0.67888 | −0.97908 | 0.068242 | −0.97908 | 0.20348 | −0.99787 | −0.20348 |
| 26 | 0 | −0.94228 | −0.97908 | 0.99767 | 0.73084 | 0.53109 | 0.2698 | 0.51958 | −0.13617 | 0.81897 | −0.3984 | 0.88789 |
| 27 | 0 | 0.55617 | −0.54545 | −0.88317 | 0.45007 | −0.74238 | −0.03414 | −0.92841 | 0.91228 | 0.005268 | 0.7981 | −0.58285 |
| 28 | 0 | −0.61775 | −0.03414 | −0.84784 | 0.91721 | −0.22014 | 0.23878 | 0.58265 | 0.3984 | 0.11923 | 0.99475 | −0.93841 |
| 29 | 0 | 0.5341 | −0.79861 | 0.8799 | −0.85442 | 0.89493 | −0.30251 | −0.36092 | 0.94228 | −0.74238 | −0.42948 | 0.93841 |

| Sequence Index | n=12 | 13 | 14 | 15 | 16 | 17 | 18 | 19 | 20 | 21 | 22 | 23 |
|---|---|---|---|---|---|---|---|---|---|---|---|---|
| 0 | −0.63109 | 0.2698 | 0.3964 | −0.97908 | 0.61958 | 0.61697 | −0.3934 | −0.59787 | −0.73084 | −0.2698 | −4.4E−15 | 0 |
| 1 | 0.3984 | 0.88789 | −0.99757 | 0.73084 | 0.81897 | 0.83109 | 0.88707 | −0.2688 | 0.13817 | −0.88780 | −1.8e−14 | 0 |
| 2 | −0.81897 | 0.99767 | −0.63109 | −0.94226 | −0.13617 | 0.51958 | 0.63109 | 0.3884 | 0.97808 | −0.99757 | 1.85e−15 | 0 |
| 3 | −0.73084 | 0.81897 | 0.13817 | 0.99787 | −0.94228 | −0.97808 | −0.13817 | −0.51958 | −0.2598 | −0.81697 | −3.5E−14 | 0 |
| 4 | 0.13617 | 0.63109 | −0.61958 | 0.2698 | −0.97908 | 0.73084 | 0.51958 | −0.81697 | −0.88789 | −0.83109 | −2.5E−14 | 0 |
| 5 | −0.94226 | 0.13617 | −0.97808 | −0.63109 | −0.2698 | −0.85789 | 0.97908 | 0.73084 | −0.3984 | −0.13617 | 1.08E−13 | 0 |
| 6 | 0.94226 | −0.13617 | 0.97908 | 0.63109 | 0.2698 | 0.88789 | −0.97908 | −0.73084 | 0.3884 | 0.13817 | 3.81E−15 | 0 |
| 7 | −0.13817 | −0.63109 | 0.51958 | −0.2698 | 0.97908 | −0.73084 | −0.51958 | 0.81697 | 0.88789 | 0.83109 | 2.36E−14 | 0 |
| 8 | 0.73084 | −0.81897 | −0.13617 | −0.99767 | 0.94226 | 0.97908 | 0.13817 | 0.51958 | 0.2698 | 0.81897 | 1.47E−13 | 0 |
| 9 | 0.81697 | −0.99787 | 0.63109 | 0.94228 | 0.13617 | −0.61968 | −0.53109 | −0.3984 | −0.97908 | 0.99767 | −8.1E−14 | 0 |
| 10 | −0.3984 | −0.88789 | 0.99767 | −0.73084 | −0.81697 | −0.63109 | −0.99767 | 0.2898 | −0.13617 | 0.88789 | 1.88E−13 | 0 |
| 11 | 0.83109 | −0.2698 | −0.3984 | 0.97908 | −0.51958 | −0.31908 | 0.3984 | 0.99767 | 0.73034 | 0.2598 | 2.15E−13 | 0 |
| 12 | 0.57668 | −0.75837 | 0.83818 | −0.76432 | 0.51958 | −0.01707 | −0.6572 | 0.89638 | −0.33488 | −0.84542 | 0.54845 | 0 |
| 13 | −0.97908 | −0.91721 | −0.68255 | −0.51958 | −0.51958 | −0.68255 | −0.91721 | −0.97908 | −0.51958 | 0.46007 | 0.99069 | 0 |
| 14 | −0.94226 | −0.2362 | 0.48007 | 0.38268 | −0.51958 | −0.71908 | 0.98292 | −0.80701 | −0.2698 | 0.71908 | 0.85442 | 0 |
| 15 | −0.13617 | −0.87647 | 0.3984 | −0.44484 | 0.99787 | 0.36288 | 0.2698 | 0.91028 | 0.12817 | −0.414 | −0.2698 | 0 |
| 16 | 1.86E−14 | 0.99636 | 0.85442 | 0.95241 | −0.67958 | 0.50492 | −0.99089 | −0.80701 | −0.97908 | −0.15308 | 0.48007 | 0 |
| 17 | −0.57898 | −0.84542 | −0.23878 | −0.01707 | 0.97908 | 0.04784 | −0.36885 | 0.35092 | −0.98292 | −0.99287 | −0.10228 | 0 |
| 18 | 0.51958 | −0.91721 | 0.97908 | 0.068242 | 0.3984 | 0.88255 | −0.2898 | −0.98292 | −0.83109 | 1 | −0.73084 | 0 |
| 19 | 0.97908 | −0.3984 | −0.32488 | 1 | −0.81687 | −0.99787 | −0.48087 | 0.57898 | 0.88789 | 0.99767 | −0.67688 | 0 |
| 20 | −0.83109 | −0.83109 | −0.57658 | 0.068242 | 0.33084 | −0.2688 | 0.088242 | −0.99089 | −0.88789 | 0.88789 | −0.91721 | 0 |
| 21 | 0.94226 | 0.75471 | 0.63108 | −0.21878 | −0.81597 | 0.30251 | −0.3984 | 0.80424 | −0.2698 | 0.094141 | −0.97908 | 0 |
| 22 | −9.8E−15 | 0.8572 | 0.68255 | 0.95314 | −0.73084 | 0.54345 | −0.20348 | 0.034141 | −0.88789 | −0.3415 | −0.08324 | 0 |
| 23 | −9.6292 | 0.18671 | −0.10228 | −0.414 | −0.97908 | −0.71908 | 0.80424 | 0.98738 | −0.33488 | 0.82388 | 0.93025 | 0 |
| 24 | 0.96292 | 0.94784 | −0.97157 | −0.99085 | 0.94226 | 0.66998 | −0.70228 | 0.81776 | −1 | −0.60492 | −0.60424 | 0 |
| 25 | −0.81597 | −0.91721 | 0.2898 | −0.48807 | 0.88789 | 1 | −0.94228 | −0.88442 | 0.81697 | 0.85442 | −0.94228 | 0 |
| 26 | 0.88789 | −0.3984 | 0.81597 | −0.13817 | 0.61958 | 0.2699 | 0.83109 | 0.73084 | 0.99787 | −0.97908 | −0.94228 | 0 |
| 27 | 0.77671 | 0.38268 | −0.87388 | −0.25332 | −0.3884 | −0.68285 | −0.36885 | −0.18671 | −0.81721 | 0.60492 | 0.87188 | 0 |
| 28 | −0.77571 | −0.99257 | 0.93028 | −0.56265 | −0.51958 | 0.97547 | −0.93028 | −0.94734 | −0.88255 | 0.78637 | 0.70711 | 0 |
| 29 | 0.48007 | −0.89493 | −0.97157 | −0.47618 | 0.13817 | 0.6341 | 0.70711 | 0.71908 | 0.57658 | 0.22014 | −0.36686 | 0 |

Below table 9 shows the comparison between the sequences generated by the proposed generating equation and the ZC sequences generated by applying the conventional cyclic extension when N=24.

TABLE 9

|  | Conventional ZC sequence | Proposed Sequence |
|---|---|---|
| Num. of Sequences | 22 | 30 |
| Num. of Sequences < CM 1.2 dB | 12 | 30 |
| Max. CM [dB] | 2.01 | 1.14 |
| Max. Cross. Cor. | 0.36 | 0.39 |
| Mean Cross. Cor. | 0.19 | 0.18 |
| Median Cross. Cor. | 0.20 | 0.18 |
| Std. Cross. Cor. | 0.07 | 0.09 |

It is noted that when the sequences are generated according to the proposed method, the number of available sequences is increased and better cross-correlation characteristics are obtained. When frequency hopping in an actual environment is counted, a BLER performance becomes better as a mean correlation value is lower. Thus, the BLER performance of the proposed sequences is superior.

V. Order Restriction of Phase Equation

The relation between the order 'k' of a phase equation with respect to a phase component of a sequence, the number of available sequences, and the correlation characteristics is as follows.

As the order "k" is increased, the number of available sequences is increased but the correlation characteristics are degraded. As the order 'k' becomes small, the number of available sequences is reduced but the correlation characteristics are improved. If k=2, ZC sequences can be generated, so if k>2, a restriction for generation of sequences is required.

A method for restricting the order of a phase equation according to the length of desired sequences according to the desired number of available sequences in consideration of the number of available sequences and correlation characteristics, when a third or hither polynomial expression is applied to phase components of sequences will now be described. When the desired number of minimum available sequences is Nseq, if the number of sequences (Nposs) that can be generated by using the second order phase equation with a desired length N of sequences is larger than or the same as Nseq (i.e. Nposs>=Nseq), the second order phase equation is used. If Nposs<Nseq, a third or higher order phase equation is used.

It can be expressed by stages as follows:

Step 1: The desired number Nseq of minimum available sequences is determined

Step 2: The number Nposs of available sequences that can be generated by the second order phase equation (k=2) is determined from the length N of the desired sequences.

Step 3: If Nposs is larger than or the same as Nseq, sequences are generated by using the second order phase equation, and if Nposs is smaller than Nseq, sequences are generated by using the third order phase equation.

First Embodiment

The following sequence generating equation having the third phase equation with k=3 is considered:

$$r(n) = e^{j\alpha n}x_u((n+\theta) \mod N_{ZC}), 0 \le n \le N-1, \quad \text{[Equation 29]}$$

$$x_u(m) = e^{-j\frac{\pi a(b_0 u_0 m^3 + b_1 u_1 m^2 + u_2 m)}{N_{ZC}}}$$

where m=0, 1, ..., $N_{ZC}$−1, N is the length of the sequence r(n), $u_0, u_1, ..., u_{k-1}$ are arbitrary integers, 'a' is an arbitrary real number, and $N_{ZC}$ is the largest prime number among natural numbers smaller than N. $e^{j\alpha n}$ is an expression, in the frequency domain, of performing cyclic shift by 'α' in the time domain. θ is a shift offset value and indicates performing of cyclic extension after shifting by θ.

It is assumed that the length N of the desired sequences is possible in the following case:

N=[12 24 36 48 60 72 96 108 120 144 180 192 216 240 288 300]

In step 1, the number Nseq of minimum available sequences is set to 30. In step 2, if the second phase equation is a=1, $u_0$=0, $u_1$=$u_2$=u, $b_0$=0, and $b_1$=$b_2$=1 in Equation 29, the available number Nposs of available ZC sequences of each N is as follows:

Nposs=[10 22 30 46 58 70 88 106 112 138 178 190 210 238 282 292]

In step 3, the length of sequences that can use the second order phase equation is N=[36 48 60 72 96 108 120 144 180 192 216 240 288 300], and the length of sequences that can use the third order phase equation is N=[12 24].

Second Embodiment

The following sequence generating equation having the third phase equation with k=3 is considered.

$$r(n) = e^{j\alpha n}x_u((n+\theta) \mod N_{ZC}), 0 \le n \le N-1, \quad \text{[Equation 30]}$$

$$x_u(m) = e^{-j\frac{\pi a(2u_0 m^3 + u_1 m^2 + u_2 m)}{N_{ZC}}}$$

It is assumed that the length N of desired sequences is possible in the following case:

N=[12 24 36 48 60 72 96 108 120 144 180 192 216 240 288 300]

In step 1, the number Nseq of minimum available sequences is 30. In step 2, if the second order phase equation is a=1, $u_0$=0, and $u_1$=$u_2$=u in Equation 30, the available number Nposs of available ZC sequences of each N is as follows:

Nposs-[10 22 30 46 58 70 88 106 112 138 178 190 210 238 282 292]

In step 3, the length of sequences that can use the second order phase equation is N=[36 48 60 72 96 108 120 144 180 192 216 240 288 300], and the length of sequences that can use the third order phase equation is N=[12 24].

The sequence generating equation for which the order of the phase equation is restricted can be expressed by two types. In a first expression method, it is assumed that a sequence with a length N is mapped in the frequency domain. This means that each element of the sequence is mapped to the N number of subcarriers. First, it is assumed that the sequence r(n) is given as follows.

$$r(n) = e^{j\alpha n}x_u((n+\theta) \mod N_{ZC}), 0 \le n \le N-1 \quad \text{[Equation 31]}$$

According to the first type of sequence generating equation, when the length N of sequences is larger than or the same as 36, a base sequence $x_u(m)$ is given as follows:

$$x_u(m) = e^{-j\frac{\pi u m(m+1)}{N_{ZC}}} \quad \text{[Equation 32]}$$

where m=0, 1, ..., $N_{ZC}$−1.

If the length N of the sequences is smaller than 36, the base sequence $x_u(m)$ is given as follows.

$$x_u(m) = e^{-j\frac{\pi 0.125(2u_0 m^3 + u_1 m^2 + u_2 m)}{N_{ZC}}} \quad \text{[Equation 33]}$$

According to a second type of sequence generating equation, the base sequence $x_u(m)$ is given as follows:

$$x_u(m) = e^{-j\frac{\pi a(2u_0 m^3 + u_1 m^2 + u_2 m)}{N_{ZC}}} \quad \text{[Equation 34]}$$

where when the length N of sequences is larger than or the same as 36, a=1 and $u_1=u_2=u$, and if the length N of sequences is smaller than 36, if a=0.125 and N=12, $u_1$ and $u_2$ are defined by the below Table 10.

TABLE 10

| Sequence Index | $u_1$ | $u_2$ | $u_3$ | CM [dB] |
|---|---|---|---|---|
| 1 | 0 | 8 | 8 | 0.17 |
| 2 | 0 | 32 | 32 | 0.85 |
| 3 | 0 | 40 | 40 | 0.43 |
| 4 | 0 | 48 | 48 | 0.43 |
| 5 | 0 | 56 | 56 | 0.85 |
| 6 | 0 | 80 | 80 | 0.17 |
| 7 | 0 | 19 | 10 | 1.08 |
| 8 | 0 | 26 | 0 | 1.12 |
| 9 | 0 | 61 | 0 | 0.87 |
| 10 | 0 | 68 | 3 | 1.18 |
| 11 | 1 | 78 | 22 | 1.11 |
| 12 | 2 | 25 | 60 | 0.99 |
| 13 | 3 | 62 | 2 | 1.15 |
| 14 | 3 | 73 | 4 | 1.15 |
| 15 | 3 | 80 | 37 | 1.10 |
| 16 | 4 | 82 | 8 | 1.18 |
| 17 | 11 | 38 | 86 | 1.18 |
| 18 | 12 | 65 | 75 | 1.12 |
| 19 | 14 | 73 | 52 | 1.20 |
| 20 | 16 | 83 | 61 | 1.05 |
| 21 | 18 | 34 | 11 | 1.11 |
| 22 | 18 | 50 | 41 | 1.16 |
| 23 | 22 | 17 | 44 | 0.88 |
| 24 | 25 | 61 | 36 | 1.14 |
| 25 | 25 | 88 | 11 | 1.17 |
| 26 | 27 | 39 | 5 | 1.12 |
| 27 | 32 | 23 | 85 | 1.12 |
| 28 | 34 | 17 | 52 | 1.10 |
| 29 | 38 | 36 | 31 | 1.04 |
| 30 | 40 | 6 | 8 | 1.18 |

If N=24, $u_1$ and $u_2$ are defined by the below Table 11.

TABLE 11

| Sequence Index | $u_1$ | $u_2$ | $u_3$ |
|---|---|---|---|
| 1 | 0 | 8 | 8 |
| 2 | 0 | 32 | 32 |
| 3 | 0 | 48 | 48 |
| 4 | 0 | 64 | 64 |
| 5 | 0 | 72 | 72 |
| 6 | 0 | 88 | 88 |
| 7 | 0 | 96 | 96 |
| 8 | 0 | 112 | 112 |
| 9 | 0 | 120 | 120 |
| 10 | 0 | 136 | 136 |
| 11 | 0 | 152 | 152 |
| 12 | 0 | 176 | 176 |
| 13 | 0 | 6 | 17 |
| 14 | 0 | 6 | 182 |
| 15 | 0 | 25 | 16 |

TABLE 11-continued

| Sequence Index | $u_1$ | $u_2$ | $u_3$ |
|---|---|---|---|
| 16 | 0 | 29 | 82 |
| 17 | 0 | 35 | 132 |
| 18 | 0 | 44 | 27 |
| 19 | 0 | 48 | 4 |
| 20 | 0 | 54 | 18 |
| 21 | 0 | 54 | 122 |
| 22 | 0 | 58 | 0 |
| 23 | 0 | 64 | 14 |
| 24 | 0 | 68 | 21 |
| 25 | 0 | 88 | 11 |
| 26 | 0 | 96 | 116 |
| 27 | 0 | 112 | 0 |
| 28 | 0 | 126 | 133 |
| 29 | 0 | 130 | 15 |
| 30 | 0 | 178 | 39 |

VI. Generation of Sequences for a Reference Signal

The following sequence generating equation is considered:

$$r(n) = e^{j\alpha n} x_u((n+\theta) \bmod N_{ZC}), \quad 0 \le n \le N-1, \quad \text{[Equation 35]}$$

$$x_u(m) = e^{-j\pi\left\{quan\left(\frac{a(u_0 m^3 + u_1 m^2 + u_2 m^1)}{N_{ZC}}\right) + u_3\right\}}$$

where m=0, 1, ..., $N_{ZC}-1$, a=0.0625, u3=1/4, N is the length of the sequence r(n), $u_0$, $u_1$, and $u_2$ are arbitrary integers, θ is a shift offset value, and $N_{ZC}$ is the largest prime number among natural numbers smaller than N. The Quantization function quan(.) is approximated to the closest {0, 1/2, 1, 3/2, 2, ... }. Namely, the quantization function quan(x) is approximated to an integer or integer+0.5 closest to 'x'. It can be expressed by quan(x)=round(2x)/2, and round(x) is an integer immediately smaller than x+0.5.

A memory capacity can be saved through quantization. The range of $u_0$, $u_1$, and $u_2$ may be extended to increase the degree of freedom to thereby generate a larger number of sequences with good performance. In this respect, however, the increase in the range of $u_0$, $u_1$, and $u_2$ causes an increase in the number of bits to represents $u_0$, $u_1$, and $u_2$. Thus, it is restricted with QPSK modulation so that only two bits are required per value regardless of the range of $u_0$, $u_1$, and $u_2$. In addition, because the basic generating equation is based on the CAZAC sequence, sequences with good correlation characteristics can be generated. For example, if the range of $0 \le u_0 \le 1024$, $0 \le u_1 \le 1024$, and $0 \le u_2 \le 1024$ is provided to generate sequences of a length of 12, memory of 30 bits (=10 bits+10 bits+10 bits) is used per sequence, so 900 bits of memory capacity is required for 30 sequences. However, when quantization is performed, memory of 720 bits (=2 bits×12×30) is sufficient for sequence regardless of the range of $u_0$, $u_1$, and $u_2$.

The above generating equation may be equivalent to a value obtained by approximating elements of sequences to a QPSK constellation phase. This is because every value can be approximated with the Nq number of values quantized between 0 and 2π that may expressed by phases through quantization function. Namely, values in a complex unit circuit the $e^{-j\theta}$ may have can be quantized to the Nq number of values to thereby approximate every value.

In this case, according to the approximating methods, the values can be approximated to the closest values, to the same or the closest small values, or to the same or the closest large values.

Elements of sequences can be approximated to values of $\{\pi/4, 3\pi/4, -\pi/4, -3\pi/4\}$ corresponding to the phases of QPSK. This means that the quantized values are approximated to the coordinates of QPSK $\{0.7071+j0.7071, 0.7071-j0.7071, 0.7071+j0.7071, -0.7071-j0.7071\}$.

Hereinafter, generation of extended sequence will be described, but a truncated sequence as in the following equation may be also used according to the length N of the desired sequences and the length $N_{ZC}$ of the ZC sequences.

$$r(n) = e^{j\alpha n}x_u(n), 0 \leq n \leq N-1,$$ [Equation 36]

$$x_u(m) = e^{-j\pi\left\{quan\left(\frac{\alpha(u_0 m^3 + u_1 m^2 + u_2 m^1)}{N_{ZC}}\right)+u_3\right\}}$$

Alternatively, if the length N of the desired sequences and the length $N_{ZC}$ of the ZC sequences are the same, sequences as in the following equation may be also used.

$$r(n) = e^{j\alpha n}x_u(n), 0 \leq n \leq N-1,$$ [Equation 37]

$$x_u(m) = e^{-j\pi\left\{quan\left(\frac{\alpha(u_0 m^3 + u_1 m^2 + u_2 m^1)}{N}\right)+u_3\right\}}$$

Substantial examples to generate a sequence generation for a reference signal will now be described.

In the uplink subframe, a PUCCH or a PUSCH is scheduled by a unit of resource blocks, and a resource block includes twelve subcarriers. Thus, a sequence with a length N=12 is required for a single resource block, a sequence of with a length N=24 is required for two resource blocks. The sequence with the length N=12 may be generated by cyclic-extending a sequence with $N_{ZC}=11$, and the sequence with the length N=24 may be generated by cyclic-extending a sequence with $N_{ZC}=23$.

(1) Reference Signal Sequence for N=12

The below table shows $u_0$, $u_1$, and $u_2$, when N=12. It shows 30 sequence combinations, which do not have such a high cross-correlation with extended ZC sequences corresponding to three resource blocks, as searched from sequences that do not exceed a CM 1.22 dB, by preferentially considering a CP (Cyclic Prefix) as the CM.

TABLE 12

| index (u) | $u_0$ | $u_1$ | $u_2$ |
|---|---|---|---|
| 0 | 29995 | 30337 | 2400 |
| 1 | 32762 | 2119 | 36039 |
| 2 | 35746 | 37587 | 26527 |
| 3 | 18603 | 33973 | 25011 |
| 4 | 18710 | 2129 | 19429 |
| 5 | 5033 | 28145 | 14997 |
| 6 | 6940 | 23410 | 7920 |
| 7 | 19235 | 26638 | 38189 |
| 8 | 2037 | 29 | 16723 |
| 9 | 8965 | 29795 | 25415 |
| 10 | 35666 | 2400 | 4229 |
| 11 | 7660 | 31762 | 17023 |
| 12 | 23501 | 14111 | 6290 |
| 13 | 32271 | 14654 | 3822 |
| 14 | 16265 | 29599 | 640 |
| 15 | 26931 | 38734 | 3401 |
| 16 | 11963 | 29706 | 22674 |
| 17 | 9560 | 24757 | 22880 |
| 18 | 22707 | 14318 | 7654 |
| 19 | 16440 | 14635 | 3587 |
| 20 | 22209 | 13004 | 10470 |

TABLE 12-continued

| index (u) | $u_0$ | $u_1$ | $u_2$ |
|---|---|---|---|
| 21 | 23277 | 2967 | 19770 |
| 22 | 25054 | 36961 | 9673 |
| 23 | 39007 | 36984 | 21639 |
| 24 | 5353 | 38653 | 26803 |
| 25 | 36686 | 19758 | 36923 |
| 26 | 3768 | 37064 | 30757 |
| 27 | 15927 | 15525 | 13082 |
| 28 | 33614 | 17418 | 37090 |
| 29 | 33995 | 7240 | 12053 |

The reference signal sequence r(n) with the length 12 generated from the above table can be expressed by the following equation:

$$r(n)=e^{j\alpha n}x_{u(n)}, x_u(n)=e^{p(n)\pi/4}, 0 \leq n < N$$ [Equation 38]

Where '$\alpha$' is a cyclic shift value, and values of the phase parameters p(n) of the base sequences $x_u(n)$ are given as shown in the following table:

TABLE 13

| Sequence index (u) | p(0), ..., p(11) |
|---|---|
| 0  | -1 -3 -1  1  1 -3  3  1  3  1  1 -1 |
| 1  | -1  3  3 -3  3  1 -1 -1 -3 -1  1 -1 |
| 2  | -1  1 -3 -1 -3 -3 -3  1 -1 -3  1 -1 |
| 3  | -1  3 -1  1  1 -3 -3 -1 -3 -3  3 -1 |
| 4  | -1  3  1 -3  3 -3 -1 -3 -3  3 -3 -1 |
| 5  | -1  1  3  3  1 -3  3  3  1  3 -1 -1 |
| 6  | -1  1  1  3 -1  1  1  1 -1 -3  3 -1 |
| 7  | -1  1  1 -1 -1 -1  3  1  3 -3  3 -1 |
| 8  | -1  3  1  3  1 -1 -1  3 -3 -1  3 -1 |
| 9  | -1 -3  1 -1 -3  1  1  1 -1  1 -3 -1 |
| 10 | -1 -3 -1 -3 -1 -1  3 -3 -3  3  1 -1 |
| 11 | -1 -3  1  1 -1 -1  1 -1  3 -3 -3 -1 |
| 12 | -1  1 -3 -1  1 -1  3  3  1 -1  1 -1 |
| 13 | -1 -3  1  3 -1 -1  3  1  1  1  1 -1 |
| 14 | -1 -1  1  1 -1 -3 -1 -3 -3  1  3 -1 |
| 15 | -1 -3  3 -1  1  1 -3 -1 -1  1 -1 -1 |
| 16 | -1  1 -3  3 -1  1 -3 -3 -3 -3 -3 -1 |
| 17 | -1  3  3 -3  3 -3 -3  1  1 -1 -3 -1 |
| 18 | -1 -1 -3 -1 -3 -3  1  1  3 -3  3 -1 |
| 19 | -1  3 -3  1  1  3 -1 -3 -3 -1 -1 -1 |
| 20 | -1  1 -1 -3 -1 -1  1  3 -3  3 -1 -1 |
| 21 | -1  1 -1  1  1  3 -1 -1 -3  3  3 -1 |
| 22 | -1  1  3 -3 -3  3 -1 -1 -3 -1 -3 -1 |
| 23 | -1 -3  1 -1 -3 -1  3 -3  3 -3 -1 -1 |
| 24 | -1 -1 -3 -3  1  1  1 -3 -1  1 -1 -1 |
| 25 | -1 -3 -1  1  1  3 -1  1 -1 -3  3 -1 |
| 26 | -1  3  3  1 -3 -3 -1  1  1 -1  1 -1 |
| 27 | -1  3  1 -1 -3 -3 -1  3 -3 -3 -1 -1 |
| 28 | -1 -3  1  1  1  3  1 -1  1 -3 -1 -1 |
| 29 | -1  3 -3  3 -1  3  3 -3  3  3 -1 -1 |

(2) Reference Signal Sequence for N=24

The below table shows $u_0$, $u_1$, and $u_2$, when N=12. It shows 30 sequence combinations, which do not have such a high cross-correlation with extended ZC sequences corresponding to three resource blocks, as searched from sequences that do not exceed a CM 1.22 dB, by preferentially considering a CP (Cyclic Prefix) as the CM.

TABLE 14

| Index (u) | $u_0$ | $u_1$ | $u_2$ |
|---|---|---|---|
| 0 | 35297 | 9057 | 9020 |
| 1 | 24379 | 861 | 26828 |
| 2 | 15896 | 4800 | 31943 |
| 3 | 6986 | 9180 | 7583 |

TABLE 14-continued

| Index (u) | $u_0$ | $u_1$ | $u_2$ |
|---|---|---|---|
| 4 | 22605 | 15812 | 10886 |
| 5 | 852 | 3220 | 18552 |
| 6 | 16048 | 10573 | 27569 |
| 7 | 15076 | 9412 | 26787 |
| 8 | 15074 | 3760 | 38376 |
| 9 | 38981 | 11775 | 37785 |
| 10 | 29686 | 14549 | 13300 |
| 11 | 21429 | 7431 | 34668 |
| 12 | 28189 | 33097 | 5721 |
| 13 | 6551 | 34694 | 36165 |
| 14 | 25833 | 17562 | 20508 |
| 15 | 38286 | 20581 | 17410 |
| 16 | 17305 | 10299 | 10752 |
| 17 | 27571 | 8218 | 1477 |
| 18 | 16602 | 31085 | 15253 |
| 19 | 14199 | 11732 | 25429 |
| 20 | 1665 | 9415 | 24015 |
| 21 | 33837 | 26684 | 9587 |
| 22 | 20569 | 33119 | 21324 |
| 23 | 27246 | 33775 | 21065 |
| 24 | 18611 | 30085 | 28779 |
| 25 | 29485 | 39582 | 28791 |
| 26 | 21508 | 25272 | 21422 |
| 27 | 5956 | 25772 | 2113 |
| 28 | 17823 | 13894 | 23873 |
| 29 | 5862 | 3810 | 35855 |

The reference signal sequence r(n) with the length 24 generated from the above table can be expressed by the following equation:

$$r(n)=e^{j\alpha n}x_{u(n)}, \quad x_u(n)=e^{p(n)\pi/4}, \quad 0\leq n<N \quad \text{[Equation 39]}$$

Where '$\alpha$' is a cyclic shift value, and values of the phase parameters p(n) of the base sequences $x_u(n)$ are given as shown in the following table:

VII. Selection of Sequence for Reference Signal

In the above description, the sequences are generated from the closed-form generation equation with respect to N=12 and N=24. However, in an actual wireless communication system, sequences generated from a single generating equation may not be applicable but mixed with other sequences. Thus, correlation characteristics or CM characteristics between the thusly generated sequences and other sequences need to be considered.

Here, a method, in which 30 sequences generated from Equation 38 and Table 13 when N=12 are compared with 26 comparative sequences and four sequences with good correlation characteristics are selected as reference signal sequences, will now be described. Further, a method, in which 30 sequences generated from Equation 39 and Table 15 when N=24 are compared with 25 comparative sequences and five sequences with good correlation characteristics are selected as reference signal sequences, will now be described.

(1) In Case of N=12

If N=12, a sequence generating equation is a cyclic shift of the base sequence $x_u(n)$ like Equation 38, and values of the phase parameters p(n) of the base sequences $x_u(n)$ are given as those shown in Table 13. Here, the method, in which 30 sequences generated when N=12 are compared with 26 comparative sequences and four sequences with good correlation characteristics are selected, will now be described. The number of cases of choosing four base sequences from among 30 base sequences is 27405 ($_{30}C_4$=30*29*28*27/4/3/2/1=27405). Thus, in order to reduce the number of cases, first, CM of the base sequences is considered.

The below table shows base sequences arranged in the order of CM size. In the table, the largest value among the CM values of all the possible cyclic shifts of the base sequences is determined as a representative CM.

TABLE 15

| Seq. index (u) | p(0), ..., p(23) |
|---|---|
| 0 | -1  3  3  3 -3  1  3 -3 -1 -3 -1  1 -3  3 -1  3  1  1 -1 -3  3 -1 -1 -1 |
| 1 | -1  1  3 -3  3 -1  3 -1  1 -1 -3 -1  3 -3 -1 -3 -3 -3 -1 -1  3  1 -1 |
| 2 | -1  3  1 -1 -3  1 -3 -1  1  1 -1 -3 -1  1 -3  1  1  1  3 -1 -1 -1 -1 |
| 3 | -1 -3  3  3 -3  1 -1 -1  3  3 -3 -3  1  3  3 -1  3 -3 -1 -1 -1 -1  1 -1 |
| 4 | -1 -1 -3 -1  3 -3 -3 -1  3 -3  3  1  1 -3 -3 -3 -3  1 -1 -3  1 -1 -1 -1 |
| 5 | -1  1 -3 -3 -1 -1  1 -1 -3 -3 -3  3  1 -3  1  3  1 -3  3 -3 -1 -3 -3 -1 |
| 6 | -1  1  1  3 -3 -1  1 -1 -1 -1  3 -1  1 -3  3  3  1 -3  1  1  1 -1 |
| 7 | -1  1  1 -3 -3 -3 -3 -3 -1  3  3 -1 -1 -3  1 -3  1 -3  1  1 -3  3 -1 |
| 8 | -1 -1  3  3 -1  3  1 -3 -3  1 -3 -1  3 -1 -1 -3  1  1 -1 -3 -3 -3 -1 |
| 9 | -1 -3  3 -1 -1 -1 -1  1  1 -3  3  1  3  3  1 -1  1 -3  1 -3  1  1 -3 -1 |
| 10 | -1 -3 -1 -3 -1 -3 -3  1  1  3  1  3 -1  3  1  1 -3 -3 -1  3  3 -1 -1 |
| 11 | -1 -3  3 -3 -3 -3 -1 -1 -3 -1 -3  3  1  3 -3 -1  3 -1  1 -1  3 -3  1 -1 |
| 12 | -1 -1  1 -3  1  3 -3  1 -1 -3 -1  3  1  3  1 -1 -3 -3 -1 -1 -3 -3 -3 -1 |
| 13 | -1 -3 -1 -1  3  1  3  1 -3 -3 -1 -3 -3 -3 -1  3  3 -1 -1 -3  1  3 -1 -1 |
| 14 | -1  1 -1 -1  3 -3  3 -3  1  1 -1  1  1  1 -1 -1  1 -3  3 -1 -1 |
| 15 | -1  1 -3 -3 -3  1  1 -3  1 -1 -1  3 -1 -3  1 -1 -1  1  1  3  1 -3 -1 |
| 16 | -1 -1 -3  3 -1 -1 -1  3  1 -3  1  1  3 -3  1 -3 -1 -1 -1  3 -3  3 -3 -1 |
| 17 | -1  1 -3 -1 -3  1  3 -3  3 -3 -3 -3  1 -1  3 -1 -3 -1 -1 -3 -3  1  1 -1 |
| 18 | -1  3  1 -3 -3 -3 -3  1 -1  1  1 -3 -1  1  1  3 -1  1  3 -1  1 -3 -1 |
| 19 | -1  1 -3 -1 -1  1 -3 -1 -3 -1  1  1  1  3  1 -3 -3  3  1  1  3  1 -1 |
| 20 | -1  1  3 -1 -1  1 -1 -3 -1  1  1  1 -3  3  1 -1 -3  3 -3 -1  3 -1 |
| 21 | -1 -3  1  1  3 -3  1  1 -3 -1 -1  1  3  1  3  1 -1  3  1  1 -3 -1 -3 -1 |
| 22 | -1 -1  3  3  3 -3 -3  3  3 -1  3 -1 -1 -1 -1  3 -3  1 -1  3 -1 -1  3 -1 |
| 23 | -1  3 -1  3 -1  1  1  3  1  3 -3  1  3 -3 -3 -1  1 -3  3  3  1 -1 -1 |
| 24 | -1 -3 -1 -1  1 -3 -1 -1  1 -1 -3  1  1 -3  1 -3 -3  3  1  1 -1  3 -1 -1 |
| 25 | -1 -1  1 -1  1  1 -1 -1 -3 -1  3 -1  1 -3  3 -1  1  3 -1  1 |
| 26 | -1  1 -3 -3 -1  1 -1  1  3  3  1  1 -1  3 -1  3  1  3  3 -1 -1 |
| 27 | -1 -1  3 -3  1 -3  1  3 -3  3  3 -1  3  3  3  1 -3 -1 -1  1 -1 |
| 28 | -1  3 -1 -1  3 -3 -1 -3 -3  3 -3  3 -1  1 -3  3  3 -3 -1 -1 -1  1 -1 |
| 29 | -1  1  1  1  3  3 -1 -1 -1 -1  3 -3 -1  3  1 -3 -1  1 -1 -1 -3  1 -1 -1 |

TABLE 16

| Sequence Index | CM |
|---|---|
| 23 | 0.6486 |
| 26 | 0.6634 |
| 29 | 0.8258 |
| 21 | 0.8961 |
| 15 | 0.9052 |
| 12 | 0.9328 |
| 14 | 0.977 |
| 28 | 0.9773 |
| 19 | 0.987 |
| 25 | 0.9991 |
| 1 | 1.0015 |
| 5 | 1.0019 |
| 22 | 1.0273 |
| 11 | 1.035 |
| 20 | 1.0376 |
| 18 | 1.0406 |
| 10 | 1.0455 |
| 3 | 1.05 |
| 0 | 1.0608 |
| 17 | 1.066 |
| 8 | 1.073 |
| 24 | 1.0927 |
| 9 | 1.1054 |
| 2 | 1.1054 |
| 4 | 1.1248 |
| 27 | 1.1478 |
| 6 | 1.1478 |
| 16 | 1.1502 |
| 7 | 1.1616 |
| 13 | 1.1696 |

When N=12, namely, because the length of base sequences corresponding to a single resource block is short, many sequences have similar cross-correlation characteristics, so sequences with a CM of more than a certain value are excluded. Here, sequences [23 26 29 21 15 12 14 28 19 25 1 5 22 11 20 18 10 3 0 17 8] having a CM lower than 1.09 are considered.

It is assumed that phase parameters $p^c(n)$ of comparative sequences that can be used together with the base sequences are those as shown in the below table. In this case, the comparative sequences are different in their phase parameters but the same in their forms as the base sequences.

TABLE 17

| Comparative Sequence Index | $p^c(0), \ldots, p^c(11)$ | | | | | | | | | | | |
|---|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | 3 | 1 | −1 | −1 | 3 | 3 | −3 | 1 | 3 | 1 | 3 | 3 |
| 11 | 1 | −3 | 1 | 1 | −3 | 1 | 1 | 1 | −3 | −3 | −3 | 1 |
| 12 | 3 | 3 | −3 | 3 | −3 | 1 | 1 | 3 | −1 | −3 | 3 | 3 |
| 13 | −3 | 1 | −1 | −3 | −1 | 3 | 1 | 3 | 3 | 3 | −1 | 1 |
| 14 | 3 | −1 | 1 | −3 | −1 | −1 | 1 | 1 | 3 | 1 | −1 | −3 |
| 15 | 1 | 3 | 1 | −1 | 1 | 3 | 3 | 3 | −1 | −1 | 3 | −1 |
| 16 | −3 | 1 | 1 | 3 | −3 | 3 | −3 | −3 | 3 | 1 | 3 | −1 |
| 17 | −3 | 3 | 1 | 1 | −3 | 1 | −3 | −3 | −1 | −1 | 1 | −3 |
| 18 | −1 | 3 | 1 | 3 | 1 | −3 | −1 | 3 | −3 | −3 | −3 | −3 |
| 19 | 1 | 1 | −3 | 3 | 3 | −1 | −3 | 3 | −1 | 3 | 3 | 3 |
| 20 | 1 | 1 | −1 | −3 | −1 | −3 | 1 | −1 | 1 | 3 | −1 | 1 |
| 21 | 1 | 1 | 3 | 1 | 3 | 3 | −1 | 1 | −1 | −3 | −3 | 1 |
| 22 | 1 | −3 | 3 | 3 | 1 | 3 | 3 | 1 | −3 | −1 | −1 | 3 |
| 23 | 1 | 3 | −3 | −3 | 3 | −3 | 1 | −1 | −1 | 3 | −1 | −3 |
| 24 | −3 | −1 | −3 | −1 | −3 | 3 | 1 | −1 | 1 | 3 | −3 | −3 |
| 25 | 3 | −3 | −3 | −1 | −1 | −3 | −1 | 3 | −3 | 3 | 1 | −1 |

Of the 30 base sequences, the best 25 combinations among the maximum cross correlation combinations with the comparative sequences, are those as shown in the below table.

TABLE 18

| No. | Combination of Sequence Indexes | | | | Mean Correlation | Max Correlation |
|---|---|---|---|---|---|---|
| 1 | 0 | 3 | 8 | 17 | 0.2568 | 0.644 |
| 2 | 3 | 8 | 17 | 25 | 0.2567 | 0.6546 |
| 3 | 0 | 8 | 17 | 25 | 0.2567 | 0.6546 |
| 4 | 0 | 3 | 17 | 25 | 0.2576 | 0.6546 |
| 5 | 0 | 3 | 8 | 25 | 0.2561 | 0.6546 |
| 6 | 8 | 17 | 25 | 28 | 0.2568 | 0.6546 |
| 7 | 3 | 17 | 25 | 28 | 0.2576 | 0.6546 |
| 8 | 0 | 17 | 25 | 28 | 0.2577 | 0.6546 |
| 9 | 3 | 8 | 25 | 28 | 0.2561 | 0.6546 |
| 10 | 0 | 8 | 25 | 28 | 0.2562 | 0.6546 |
| 11 | 0 | 3 | 25 | 28 | 0.2571 | 0.6546 |
| 12 | 3 | 8 | 17 | 28 | 0.2568 | 0.6546 |
| 13 | 0 | 8 | 17 | 28 | 0.2569 | 0.6546 |
| 14 | 0 | 3 | 17 | 28 | 0.2577 | 0.6546 |
| 15 | 0 | 3 | 8 | 28 | 0.2562 | 0.6546 |
| 16 | 17 | 25 | 28 | 29 | 0.2576 | 0.6755 |
| 17 | 8 | 25 | 28 | 29 | 0.2561 | 0.6755 |
| 18 | 3 | 25 | 28 | 29 | 0.257 | 0.6755 |
| 19 | 0 | 25 | 28 | 29 | 0.257 | 0.6755 |
| 20 | 8 | 17 | 28 | 29 | 0.2568 | 0.6755 |
| 21 | 3 | 17 | 28 | 29 | 0.2576 | 0.6755 |
| 22 | 0 | 17 | 28 | 29 | 0.2577 | 0.6755 |
| 23 | 3 | 8 | 28 | 29 | 0.2560 | 0.6755 |
| 24 | 0 | 8 | 28 | 29 | 0.2562 | 0.6755 |
| 25 | 0 | 3 | 28 | 29 | 0.2571 | 0.6755 |

From the above table, if four sequences that have good mean cross characteristics and maximum cross characteristics when compared with the comparative sequences and satisfy desired CM characteristics are to be selected from among the 30 sequences having the same base sequence generating equation as the Equation 36 and having the values of the phase parameters p(n) as provided in Table 13, the four sequences having the sequence indexes [3 8 28 29] would be base sequences.

Finally, the reference signal sequence r(n) with the length N=12 is as follows:

$$r(n)=e^{j\alpha n}x_u(n), \ 0 \leq n < N \ x_u(n)=e^{jp(n)\pi/4} \quad \text{[Equation 40]}$$

where 'α' is a cyclic shift value, and the values of the phase parameters p(n) of the base sequences $x_u(n)$ are given as those shown in the below table.

TABLE 19

| $p(0), \ldots, p(11)$ | | | | | | | | | | | |
|---|---|---|---|---|---|---|---|---|---|---|---|
| −1 | 3 | −1 | 1 | 1 | −3 | −3 | −1 | −3 | −3 | 3 | −1 |
| −1 | 3 | 1 | 3 | 1 | −1 | −1 | 3 | −3 | −1 | −3 | −1 |
| −1 | −3 | 1 | 1 | 1 | 3 | 1 | −1 | 1 | −3 | −3 | −1 |
| −1 | 3 | −3 | 3 | −1 | 3 | 3 | −3 | 3 | 3 | −1 | −1 |

(2) In Case of N=24

When N=12, a sequence generating equation is a cyclic shift of the base sequence $x_u(n)$ like Equation 37, and values of the phase parameters p(n) of the base sequences $x_u(n)$ are given as those shown in Table 15. Here, the method, in which the 30 sequences generated when N=24 are compared with 25 comparative sequences and five sequences with good correlation characteristics are selected, will now be described. The number of cases of choosing five base sequences from among 30 base sequences is 142506 ($_{30}C4=30*29*28*27*26/5/4/3/2/1=142506$).

It is assumed that phase parameters $p^c(n)$ of the comparative sequences that can be used together with the base sequences are those as shown in the below table. In this case, the comparative sequences are different only in their phase parameters but the same in their forms as the base sequences.

20 combinations with the best cross-correlation characteristics among all the possible combinations are those as shown in the below table.

TABLE 21-continued

| No. | Combination of Sequence Indexes | | | | | Mean Correlation | Max Correlation |
|---|---|---|---|---|---|---|---|
| 15 | 9 | 11 | 16 | 24 | 25 | 0.181 | 0.4917 |
| 16 | 9 | 11 | 12 | 24 | 25 | 0.181 | 0.4917 |
| 17 | 11 | 12 | 16 | 21 | 24 | 0.1807 | 0.4917 |
| 18 | 9 | 12 | 16 | 21 | 24 | 0.1806 | 0.4917 |
| 19 | 9 | 11 | 16 | 21 | 24 | 0.1808 | 0.4917 |
| 20 | 9 | 11 | 12 | 21 | 24 | 0.1808 | 0.4917 |

Among the combinations, combinations {7, 8, 9, 10, 11, 12, 13, 14, 17, 18, 19, 20} have a mean correlation value greater than 0.181.

The below table shows base sequences arranged in the order of CM size. In the table, the largest value among the CM values of all the possible cyclic shifts of the base sequences is determined as a representative CM.

TABLE 20

| Comp. Sequence Index | $p^c(0), \ldots, p^c(23)$ |
|---|---|
| 0 | -1  3  1 -3  3 -1  1  3 -3  3  1  3 -3  3  1  1 -1  1  3 -3  3 -3 -1 -3 |
| 1 | -3  3 -3 -3 -3  1 -3 -3  3 -1  1  1  1  3  1 -1  3 -3 -3  1  3  1  1 -3 |
| 2 |  3 -1  3  3  1  1 -3  3  3  3  3  1 -1  3 -1  1  1 -1 -3 -1 -1  1  3  3 |
| 3 | -1 -1 -1 -3 -3 -1  1  1  3  3 -1  1 -1  1  1 -1 -3 -3  1 -3 -1 -1 |
| 4 | -3  1  1  3 -1  1  3  1 -3  1 -3  1  1 -1 -1  3 -1 -3  3 -3 -3 -3  1  1 |
| 5 |  1  1 -1 -1  3 -3 -3  3 -3  1 -1 -1  1 -1  1  1 -1 -3 -1  1 -1  3 -1 -3 |
| 6 | -3  3  3 -1 -1 -3 -1  3  1  3  1  3  1  1 -1  3  1 -1  1  3 -3 -1 -1  1 |
| 7 | -3  1  3 -3  1 -1 -3  3 -3  3 -1 -1 -1 -1  1 -3 -3 -3  1 -3 -3  3 -1 -3 |
| 8 |  1  1 -3  3  3 -1 -3 -1  3 -3  3  3  3 -1  1 -3  1 -1  1  1 -3  1  1 -1 |
| 9 | -1  1 -3 -3  3 -1  3 -1 -1 -3 -3 -3 -1 -3 -3  1 -1  1  3  3 -1  1 -1  3 |
| 10 |  1  3  3 -3 -3  1  3  1 -1 -3 -3 -3  3  3 -3  3  3 -1 -3  3 -1  1 -3  1 |
| 11 |  1  3  3  1  1  1 -1 -1  1 -3  3 -1  1  1 -3  3  3 -1 -3  3 -3 -1 -3 -1 |
| 12 |  3 -1 -1 -1 -1 -3 -1  3  3  1 -1  1  3  3  3 -1  1  1 -3  1  3 -1 -3  3 |
| 13 | -3 -3  3  1  3  1 -3  3  1  3  1  1  3  3 -1 -1 -3  1 -3 -1  3  1  1  3 |
| 14 |  1  3 -1  3  3 -1 -3  1 -1 -3  3  3  3 -1  1  1  3 -1 -3 -1  3 -1 -1 -1 |
| 15 |  1  1  1  1  1 -1  3 -1 -3  1  1  3 -3  1 -3 -1  1  1 -3 -3  3  1  1 -3 |
| 16 |  1  3  3 -1 -3  3 -1  3  3  3 -3  1 -1  1 -1 -3 -1  1  3 -1  3 -3 -3 |
| 17 | -3 -3  1  1 -1  1 -1  1 -1  3  1 -3 -1  1 -1 -3  1 -1 -3  3 -3 -1  1 -3 |
| 18 | -3 -1 -3  3  1 -1 -3 -1 -3 -3  3 -3 -1  1  3  1 -3  1  3  3 -1 -3 |
| 19 | -1 -1 -1 -1  3  3  3  1  3  3 -3  1  3 -1  3  3 -3  3  1 -1  3  3 |
| 20 |  1 -1  3  3 -1 -3  3 -3 -1 -1  3 -1  3 -1 -1  1  1  1 -1 -1 -3 -1  3 |
| 21 |  1 -1  1 -1  3 -1  3  1  1 -1 -1 -3  1  1 -3  1  3 -3  1 -3 -3 -1 -1 |
| 22 | -3 -1  1  3  1  1 -3 -1 -1 -3  3 -3  3  1 -3  3 -3  1 -1  1 -3  1  1  1 |
| 23 | -1 -3  3  3  1  1  3 -1 -3 -1 -1 -1  3  1 -3 -3 -1  3 -3 -1 -3 -1 -3 -1 |
| 24 |  1  1 -1 -1 -3 -1  3 -1  3 -1  1  3  1 -1  3  1  3 -3 -3  1 -1 -1  1  3 |

TABLE 21

| No. | Combination of Sequence Indexes | | | | | Mean Correlation | Max Correlation |
|---|---|---|---|---|---|---|---|
| 1 | 9 | 11 | 16 | 21 | 27 | 0.1811 | 0.4791 |
| 2 | 11 | 12 | 16 | 21 | 25 | 0.181 | 0.4844 |
| 3 | 9 | 12 | 16 | 21 | 25 | 0.181 | 0.4844 |
| 4 | 9 | 11 | 12 | 21 | 25 | 0.1812 | 0.4844 |
| 5 | 9 | 11 | 12 | 16 | 25 | 0.1812 | 0.4844 |
| 6 | 9 | 11 | 12 | 16 | 25 | 0.1811 | 0.4844 |
| 7 | 12 | 16 | 21 | 24 | 25 | 0.1806 | 0.4917 |
| 8 | 11 | 16 | 21 | 24 | 25 | 0.1808 | 0.4917 |
| 9 | 9 | 16 | 21 | 24 | 25 | 0.1807 | 0.4917 |
| 10 | 11 | 12 | 21 | 24 | 25 | 0.1808 | 0.4917 |
| 11 | 9 | 12 | 21 | 24 | 25 | 0.1807 | 0.4917 |
| 12 | 9 | 11 | 21 | 24 | 25 | 0.189 | 0.4917 |
| 13 | 11 | 12 | 16 | 24 | 25 | 0.1809 | 0.4917 |
| 14 | 9 | 12 | 16 | 24 | 25 | 0.1808 | 0.4917 |

TABLE 22

| Sequence Index | CM |
|---|---|
| 6 | 0.6423 |
| 12 | 0.7252 |
| 23 | 0.7632 |
| 20 | 0.8265 |
| 8 | 0.883 |
| 9 | 0.8837 |
| 19 | 0.9374 |
| 10 | 0.966 |
| 25 | 0.9787 |
| 11 | 0.9851 |
| 13 | 0.9966 |
| 29 | 1.0025 |
| 14 | 1.0112 |
| 28 | 1.0113 |
| 27 | 1.0143 |
| 17 | 1.0176 |

TABLE 22-continued

| Sequence Index | CM |
|---|---|
| 7 | 1.0191 |
| 22 | 1.0316 |
| 24 | 1.0387 |
| 5 | 1.0407 |
| 18 | 1.059 |
| 15 | 1.0722 |
| 3 | 1.0754 |
| 0 | 1.0761 |
| 21 | 1.094 |
| 1 | 1.0952 |
| 16 | 1.1131 |
| 26 | 1.1193 |
| 4 | 1.1223 |
| 2 | 1.1251 |

Sequence indexes included in the selected combinations are 9, 11, 12, 16, 21, 24, 25, of which the sequence index is excluded because it has low CM characteristics of the base sequence. Thus, the selectable combinations are reduced to the following four sequence indexes.

TABLE 23

| Combination of Sequence Indexes | | | | | Mean Correlation | Max Correlation |
|---|---|---|---|---|---|---|
| 11 | 12 | 21 | 24 | 25 | 0.1808 | 0.4917 |
| 9 | 12 | 21 | 24 | 25 | 0.1807 | 0.4917 |
| 9 | 11 | 12 | 21 | 24 | 0.1806 | 0.4917 |
| 9 | 11 | 21 | 24 | 25 | 0.1809 | 0.4917 |

If five sequences, which have good cross-correlation characteristics and CM characteristics with the comparative sequences and have a minimum correlation values, are to be selected from the above combinations, the sequences [9 11 12 21 24] will be base sequences.

Finally, the reference signal sequence r(n) with the length N=24 is as follows:

$$r(n)=e^{j\alpha n}x_u(n),\ 0\leq n<N\ x_u(n)=e^{jp(n)\pi/4}$$ [Equation 41]

wherein 'α' is a cyclic shift value, and the values of the phase parameters p(n) of the base sequences $x_u(n)$ are given as those shown in the below table.

TABLE 24

| p(0), ..., p(23) | | | | | | | | | | | | | | | | | | | | | | | |
|---|---|---|---|---|---|---|---|---|---|---|---|---|---|---|---|---|---|---|---|---|---|---|---|
| −1 | −3 | 3 | −1 | −1 | −1 | −1 | 1 | 1 | −3 | 3 | 1 | 3 | 3 | 1 | −1 | 1 | −3 | 1 | −3 | 1 | 1 | −3 | −1 |
| −1 | −3 | 3 | −3 | −3 | −3 | −1 | −1 | −3 | −1 | −3 | 3 | 1 | 3 | −3 | −1 | 3 | −1 | 1 | −1 | 3 | −3 | 1 | −1 |
| −1 | −1 | 1 | −3 | 1 | 3 | −3 | 1 | −1 | −3 | −1 | 3 | 1 | 3 | 1 | −1 | −3 | −1 | −1 | −3 | −3 | −3 | −3 | −1 |
| −1 | −3 | 1 | 1 | 3 | −3 | 1 | 1 | −3 | −1 | −1 | 1 | 3 | 1 | 3 | 1 | −1 | 3 | 1 | 1 | −3 | −1 | −3 | −1 |
| −1 | −3 | −1 | −1 | 1 | −3 | −1 | −1 | 1 | −1 | −3 | 1 | 1 | −3 | 1 | −3 | −3 | 3 | 1 | 1 | −1 | 3 | −1 | −1 |

All the 30 base sequences can be obtained by using the phase parameter values of the 25 comparative sequences given as shown in Table 20.

Figure 8:
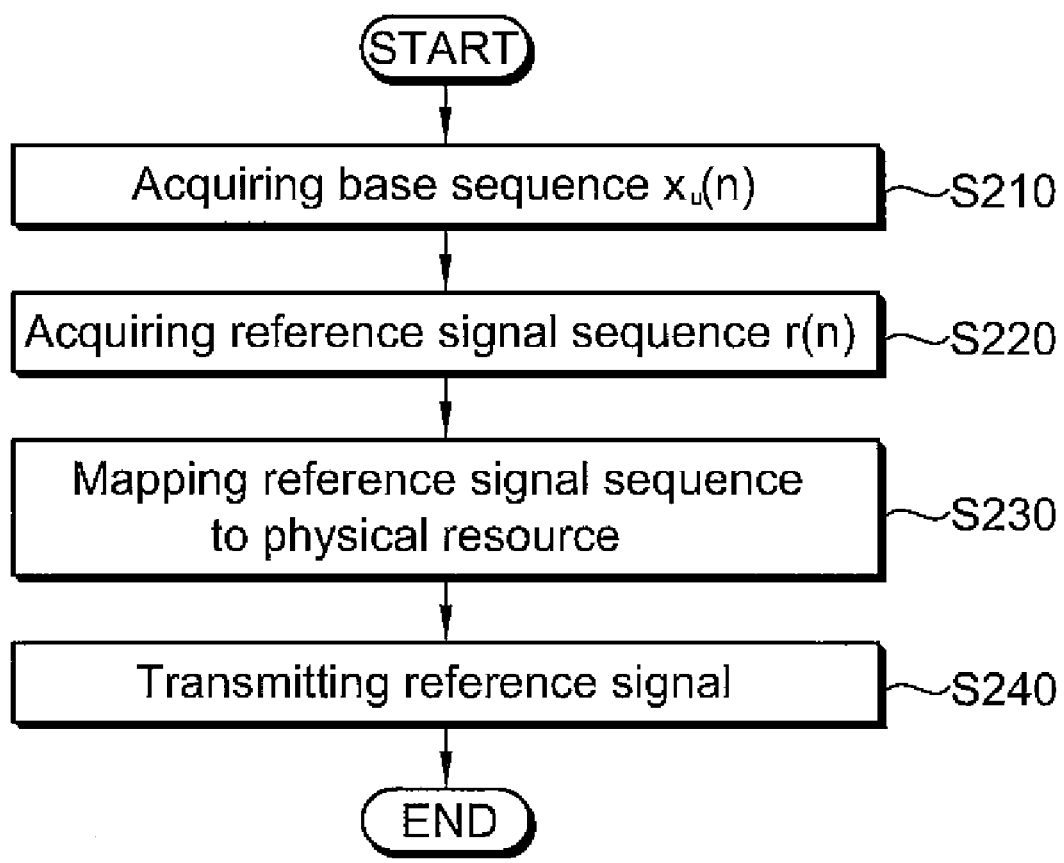
FIG. 8 is a flow chart illustrating the process of a reference signal transmission method according to an embodiment of the present invention.

FIG. 8 is a flow chart illustrating the process of a reference signal transmission method according to an embodiment of the present invention.

Referring to FIG. 8, in step S210, the following base sequence $x_u(n)$ is acquired.

$$x_u(n)=e^{jp(n)\pi/4}$$ [Equation 42]

The phase parameter p(n) is determined according to the length of the base sequences, namely, the number of allocated resource blocks. In case of one resource block (N=12), at least one of the 30 phase parameters p(n) given as shown in Table 17 and Table 19 can be used. In case of two resource blocks (N=24), at least one of the 30 phase parameters p(n) given as shown in Table 20 and Table 24 can be used.

In step S220, the reference signal sequence r(n) defined by the following equation by the cyclic shift 'α' of the base sequence $x_u(n)$ is acquired.

$$r(n)=e^{j\alpha n}x_u(n),\ 0\leq n<N$$ [Equation 43]

In step S230, the reference signal sequence r(n) is mapped to a physical resource. In this case, the physical resource may be a resource element or a subcarrier.

In step S240, the reference signal sequence mapped to the physical resource is converted into an SC-FDMA signal, which is then transmitted in the uplink direction.

Sequences having good correlation characteristics and CM characteristics compared with comparative sequences are selected from among sequences generated by a closed-form generating equation, and used as an uplink reference signal. Although the sequences are used as the uplink reference signal together with the comparative sequences, the desired sequence characteristics can be maintained, so the data demodulation performance can be improved and accurate uplink scheduling can be possibly performed.

Sequences generated from a closed-form generating equation are compared with comparative sequences, from which those with good correlation and CM characteristics are used as an uplink reference signal. Although those sequences with good correlation and CM characteristics are used along with the comparative sequences as the uplink reference signal, desired sequence characteristics can be maintained, to thus enhance a data demodulation performance and perform an accurate uplink scheduling.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

What is claimed is:

1. A method for transmitting a reference signal in a wireless communication system, the method comprising:
   mapping a reference signal sequence r(n), defined by a base sequence $x_u(n)$ and having a length N, to N subcarriers; and
   transmitting the mapped reference signal sequences r(n) on an uplink channel,
   wherein the base sequence $x_u(n)$ is expressed by $x_u(n) = e^{jp(n)\pi/4}$, and if N=12, at least one of the sets of values provided in the below table is used as a set of values for the phase parameter p(n):

| p(0), . . . , p(11) | | | | | | | | | | | |
|---|---|---|---|---|---|---|---|---|---|---|---|
| −1 | 3 | −1 | 1 | 1 | −3 | −3 | −1 | −3 | −3 | 3 | −1 |
| −1 | 3 | 1 | 3 | 1 | −1 | −1 | 3 | −3 | −1 | −3 | −1 |
| −1 | −3 | 1 | 1 | 1 | 1 | 3 | 1 | −1 | 1 | −3 | −1 |
| −1 | 3 | −3 | 3 | −1 | 3 | 3 | −3 | 3 | 3 | −1 | −1. |

2. The method of claim 1, wherein, if N=24, at least one of the sets of values provided in the below table is used as a set of values for the phase parameter p(n):

| p(0), . . . , p(23) | | | | | | | | | | | | | | | | | | | | | | | |
|---|---|---|---|---|---|---|---|---|---|---|---|---|---|---|---|---|---|---|---|---|---|---|---|
| −1 | −3 | 3 | −1 | −1 | −1 | −1 | 1 | 1 | −3 | 3 | 1 | 3 | 1 | −1 | 1 | −3 | 1 | −3 | 1 | 1 | −3 | −1 | |
| −1 | −3 | 3 | −3 | −3 | −3 | −1 | −1 | −3 | −1 | −3 | 3 | 1 | 3 | −3 | −1 | 3 | −1 | 1 | −1 | 3 | −3 | 1 | −1 |
| −1 | −1 | 1 | −3 | 1 | 3 | −3 | 1 | −1 | −3 | −1 | 3 | 1 | 3 | 1 | −1 | −3 | −3 | −1 | −1 | −3 | −3 | −3 | −1 |
| −1 | −3 | 1 | 1 | 3 | −3 | 1 | 1 | −3 | −1 | −1 | 1 | 3 | 1 | 3 | 1 | −1 | 3 | 1 | 1 | −3 | −1 | −3 | −1 |
| −1 | −3 | −1 | −1 | 1 | −3 | −1 | −1 | 1 | −1 | −3 | 1 | 1 | −3 | 1 | −3 | −3 | 3 | 1 | 1 | −1 | 3 | −1 | −1. |

3. The method of claim 1, wherein the reference signal sequence r(n) is defined by the base sequence $x_u(n)$ as follows:

$r(n) = e^{j\alpha n} x_u(n)$ by a cyclic shift α of the base sequence $x_u(n)$.

4. The method of claim 1, wherein the uplink channel is a physical uplink control channel (PUCCH).

5. The method of claim 1, wherein the uplink channel is a physical uplink shared channel (PUSCH).

6. The method of claim 1, wherein the reference signal sequence r(n) is a demodulation reference signal used for demodulating uplink data.

7. The method of claim 1, wherein the reference signal sequence r(n) is a sounding reference signal used for user scheduling.

8. A mobile communication terminal configured to transmit a reference signal in a wireless communication system, comprising:
   an antenna;
   a communications module operatively connected to the antenna; and
   a processor operatively connected to the communications module, the processor configured to
      map a reference signal sequence r(n), defined by a base sequence $x_u(n)$ and having a length N, to N subcarriers; and
      transmit the mapped reference signal sequence r(n) on an uplink channel,
   wherein the base sequence $x_u(n)$ is expressed by $x_u(n) = e^{jp(n)\pi/4}$, and if N=12, at least one of the sets of values provided in the below table is used as a set of values for the phase parameter p(n):

| p(0), . . . , p(11) | | | | | | | | | | | |
|---|---|---|---|---|---|---|---|---|---|---|---|
| −1 | 3 | −1 | 1 | 1 | −3 | −3 | −1 | −3 | −3 | 3 | −1 |
| −1 | 3 | 1 | 3 | 1 | −1 | −1 | 3 | −3 | −1 | −3 | −1 |
| −1 | −3 | 1 | 1 | 1 | 1 | 3 | 1 | −1 | 1 | −3 | −1 |
| −1 | 3 | −3 | 3 | −1 | 3 | 3 | −3 | 3 | 3 | −1 | −1. |

9. The mobile communication terminal of claim 8, wherein, if N=24, at least one of the sets of values provided in the below table is used as a set of values for the phase parameter p(n):

| p(0), ..., p(23) |
|---|
| −1 −3  3 −1 −1 −1 −1  1  1 −3  3  1  3  3  1 −1  1 −3  1 −3  1  1 −3 −1 |
| −1 −3  3 −3 −3 −3 −1 −1 −3 −1 −3  3  1  3 −3 −1  3 −1  1 −1  3 −3  1 −1 |
| −1 −1  1 −3  1  3 −3  1 −1 −3 −1  3  1  3  1 −1 −3 −3 −1 −1 −3 −3 −3 −1 |
| −1 −3  1  1  3 −3  1  1 −3 −1 −1  1  3  1  3  1 −1  3  1  1 −3 −1 −3 −1 |
| −1 −3 −1 −1  1 −3 −1 −1  1 −1 −3  1  1 −3  1 −3 −3  3  1  1 −1  3 −1 −1. |

10. The mobile communication terminal of claim 8, wherein the reference signal sequence r(n) is defined by the base sequence $x_u(n)$ as follows $$r(n)=e^{j\alpha n}x_u(n)$$

via a cyclic shift a of the base sequence $x_u(n)$.

11. The mobile communication terminal of claim 8, wherein the uplink channel is a physical uplink control channel (PUCCH).

12. The mobile communication terminal of claim 8, wherein the uplink channel is a physical uplink shared channel (PUSCH).

13. The mobile communication terminal of claim 8, wherein the reference signal sequence r(n) is a demodulation reference signal used for demodulating uplink data.

14. The mobile communication terminal of claim 8, wherein the reference signal sequence r(n) is a sounding reference signal used for user scheduling.

* * * * *